United States Patent
Choi et al.

(10) Patent No.: US 12,490,311 B2
(45) Date of Patent: Dec. 2, 2025

(54) METHOD AND APPARATUS FOR REPEATED RANDOM ACCESS PREAMBLE TRANSMISSION AND RECEPTION IN WIRELESS COMMUNICATION SYSTEM

(71) Applicant: Samsung Electronics Co., Ltd., Gyeonggi-do (KR)

(72) Inventors: Seunghoon Choi, Gyeonggi-do (KR); Jinkyu Kang, Gyeonggi-do (KR); Taehyoung Kim, Gyeonggi-do (KR); Youngbum Kim, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 641 days.

(21) Appl. No.: 17/621,952

(22) PCT Filed: Jun. 29, 2020

(86) PCT No.: PCT/KR2020/008457
§ 371 (c)(1),
(2) Date: Dec. 22, 2021

(87) PCT Pub. No.: WO2020/263053
PCT Pub. Date: Dec. 30, 2020

(65) Prior Publication Data
US 2022/0322454 A1 Oct. 6, 2022

(30) Foreign Application Priority Data
Jun. 27, 2019 (KR) .................. 10-2019-0077316

(51) Int. Cl.
*H04W 72/231* (2023.01)
*H04B 17/318* (2015.01)
(Continued)

(52) U.S. Cl.
CPC ...... *H04W 74/0841* (2013.01); *H04B 17/318* (2015.01); *H04B 17/328* (2023.05);
(Continued)

(58) Field of Classification Search
CPC .......... H04W 56/001; H04W 74/0833; H04W 72/231; H04W 72/232; H04L 12/413; H04B 17/328
See application file for complete search history.

(56) References Cited

U.S. PATENT DOCUMENTS

| 2015/0016312 A1 | 1/2015 | Li et al. |
| 2015/0215903 A1* | 7/2015 | Zhao ..................... H04W 72/04 370/329 |

(Continued)

FOREIGN PATENT DOCUMENTS

| CN | 105379336 | 3/2016 |
| CN | 108141891 | 6/2018 |

(Continued)

OTHER PUBLICATIONS

ETSI, "TS 136 321 V15.5.0", May 2019, pp. 1-133 (Year: 2019).*

(Continued)

*Primary Examiner* — Salvador E Rivas
(74) *Attorney, Agent, or Firm* — The Farrell Law Firm, P.C.

(57) ABSTRACT

The present disclosure relates to a communication technique for combining an IoT technology with a 5G communication system for supporting a higher data transmission rate than a 4G system, and a system therefor. The present disclosure can be applied to intelligent services (for example, smart homes, smart buildings, smart cities, smart cars or connected cars, health care, digital education, retail businesses, security and safety-related services, and the like) on the basis of 5G communication technologies and IoT-related technologies.

(Continued)

A method for a terminal in a wireless communication system, according to the present disclosure, comprises: measuring reference signal received power (RSRP) values corresponding to respective synchronization signal blocks (SSBs) on the basis of a plurality of SSBs which have been transmitted by a base station; identifying a coverage enhancement (CE) level of the terminal on the basis of the measured RSRP values and at least one RSRP threshold; and transmitting at least one random access preamble to the base station on the basis of the identified CE level.

16 Claims, 19 Drawing Sheets

(51) Int. Cl.
  *H04L 12/413* (2006.01)
  *H04W 56/00* (2009.01)
  *H04W 72/0446* (2023.01)
  *H04W 74/08* (2009.01)
  *H04W 74/0833* (2024.01)
  *H04W 72/232* (2023.01)

(52) U.S. Cl.
  CPC ......... *H04L 12/413* (2013.01); *H04W 56/001* (2013.01); *H04W 72/0446* (2013.01); *H04W 72/231* (2023.01); *H04W 74/0833* (2013.01); *H04W 74/0866* (2013.01); *H04W 72/232* (2023.01)

(56) References Cited

U.S. PATENT DOCUMENTS

| | | | |
|---|---|---|---|
| 2015/0296518 A1 | 10/2015 | Yi et al. | |
| 2016/0205660 A1 | 7/2016 | Ryu et al. | |
| 2017/0006641 A1 | 1/2017 | Dinan | |
| 2017/0099682 A1 | 4/2017 | Priyanto et al. | |
| 2018/0070282 A1 | 3/2018 | Su et al. | |
| 2018/0220373 A1* | 8/2018 | Arzelier | H04W 52/0277 |
| 2018/0279239 A1 | 9/2018 | Si et al. | |
| 2018/0376427 A1* | 12/2018 | Arzelier | H04W 52/0241 |
| 2019/0007951 A1* | 1/2019 | Kwak | H04W 4/70 |
| 2019/0110314 A1 | 4/2019 | Abedini et al. | |
| 2019/0281633 A1 | 9/2019 | Ahn et al. | |
| 2019/0363809 A1 | 11/2019 | Yoon et al. | |
| 2020/0169970 A1* | 5/2020 | Liu | H04W 52/245 |
| 2020/0187237 A1* | 6/2020 | Su | H04L 1/1896 |
| 2020/0205052 A1 | 6/2020 | Su et al. | |
| 2020/0351953 A1* | 11/2020 | Pradas | H04W 74/04 |
| 2021/0258841 A1* | 8/2021 | Cai | H04W 36/0094 |
| 2021/0298087 A1* | 9/2021 | Ohara | H04W 74/0833 |
| 2022/0039068 A1* | 2/2022 | Hoglund | H04W 74/0833 |

FOREIGN PATENT DOCUMENTS

| | | |
|---|---|---|
| CN | 109644079 | 4/2019 |
| IN | 201727023859 | 11/2017 |
| KR | 10-2018-0137419 | 12/2018 |
| KR | 10-2019-0022643 | 3/2019 |

OTHER PUBLICATIONS

PCT/ISA/210 Search Report issued on PCT/KR2020/008457, Sep. 21, 2020, pp. 5.
PCT/ISA/237 Written Opinion issued on PCT/KR2020/008457, Sep. 21, 2020, pp. 5.
Ericsson, "Support for transmission in preconfigured UL resources in LTE-MTC", R1-1905957, 3GPP TSG-RAN WG1 Meeting #97, Reno, Nevada, USA, May 4, 2019, pp. 14.
European Search Report dated Jul. 4, 2022 issued in counterpart application No. 20831905.3-1215, 6 pages.
Chinese Office Action dated Mar. 30, 2024 issued in counterpart application No. 202080047172.8, 17 pages.
Indian Examination Report dated May 10, 2024 Issued In counterpart application No. 202137059943, 7 pages.
Chinese Office Action dated Feb. 20, 2025 issued in counterpart application No. 2020800471728, 8 pages.
Indian Hearing Notice dated Mar. 10, 2025 issued in counterpart application No. 202137059943, 2 pages.
Korean Office Action dated Apr. 24, 2025 issued in counterpart application No. 10-2019-0077316, 8 pages.

* cited by examiner

METHOD AND APPARATUS FOR REPEATED RANDOM ACCESS PREAMBLE TRANSMISSION AND RECEPTION IN WIRELESS COMMUNICATION SYSTEM

PRIORITY

This application is a National Phase Entry of PCT International Application No. PCT/KR2020/008457, which was filed on Jun. 29, 2020, and claims priority to Korean Patent Application No. 10-2019-0077316, which was filed on Jun. 27, 2019, the content of each of which is incorporated herein by reference.

TECHNICAL FIELD

The disclosure relates to a cellular wireless communication system, and more particularly, to a method in which a terminal transmits a random access preamble for random access to a base station.

BACKGROUND ART

In order to satisfy increases in demand for wireless data traffic now that a 4G communication system is commercially available, efforts are being made to develop an enhanced 5G communication system or a pre-5G communication system. Therefore, a 5G communication system or a pre-5G communication system is referred to as a beyond 4G network communication system or a post LTE system. In order to achieve a high data transmission rate, consideration is being given to implementation of the 5G communication system in a mmWave band (e.g., 60 GHz band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna are being discussed for the 5G communication system. Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (CoMP), and interference cancellation have been developed. Further, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, have been developed for the 5G system.

Innovation of Internet from a human-centered connection network in which a human generates and consumes information to an Internet of Things (IoT) network that gives and receives and processes information to and from distributed constituent elements such as things has occurred. Internet of Everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through convergence and complex connections between existing information technology (IT) and various industries.

Accordingly, various attempts for applying a 5G communication system to an IoT network have been undertaken. For example, 5G communication technologies such as a sensor network, machine to machine (M2M), and machine type communication (MTC) have been implemented by the technique of beamforming, MIMO, and array antenna. Application of a cloud RAN as the foregoing big data processing technology may be an example of convergence of 5G technology and IoT technology.

5G communication systems are being developed to support various services such as enhanced mobile broadband (eMBB), massive machine type communication (mMTC), ultra reliability low latency communication (URLLC), and in order to provide various services, there is a need for a base station to broadcast configuration information for a terminal that provides these services. Further, the terminal needs to perform random access for various services.

DISCLOSURE OF INVENTION

Technical Problem

The disclosure provides an efficient random access method and device for various services in a mobile communication system.

Solution to Problem

According to the disclosure, a method performed by a terminal in a wireless communication system includes measuring reference signal received power (RSRP) values corresponding to each SSB based on a plurality of synchronization signal blocks (SSBs) transmitted by a base station; identifying a coverage enhancement (CE) level of the terminal based on the measured RSRP values and at least one RSRP threshold; and transmitting one or more random access preambles to the base station based on the identified CE level.

According to the disclosure, a terminal of a wireless communication system includes a transceiver; and a controller connected to the transceiver and configured to control to measure reference signal received power (RSRP) values corresponding to each SSB based on a plurality of synchronization signal blocks (SSB) transmitted by a base station, to identify a coverage enhancement (CE) level of the terminal based on the measured RSRP values and at least one RSRP threshold, and to transmit one or more random access preambles to the base station based on the identified CE level.

According to the disclosure, a method performed by a base station in a wireless communication system includes transmitting a plurality of synchronization signal blocks (SSBs); receiving a random access preamble transmitted by a terminal; identifying, by the terminal, an index of an SSB selected as a basis for random access preamble transmission and a coverage enhancement (CE) level of the terminal based on the received random access preamble and a resource in which the random access preamble is received;

and performing a random access procedure based on the identified index of the SSB and the CE level of the terminal.

According to the disclosure, a base station in a wireless communication system includes a transceiver; and a controller connected to the transceiver and configured to control to transmit a plurality of synchronization signal blocks (SSB), to receive a random access preamble transmitted by a terminal, to identify, by the terminal, an index of an SSB selected as a basis for random access preamble transmission and a coverage enhancement (CE) level of the terminal based on the received random access preamble and a resource in which the random access preamble is received, and to perform a random access procedure based on the identified index of the SSB and the CE level of the terminal.

Advantageous Effects of Invention

The disclosure provides an efficient random access method and device in a mobile communication system, so that a terminal and/or node desiring to transmit and receive an uplink signal can repeatedly transmit and receive a random access preamble for coverage improvement and efficiently operate random access.

MODE FOR THE INVENTION

Figure 1:
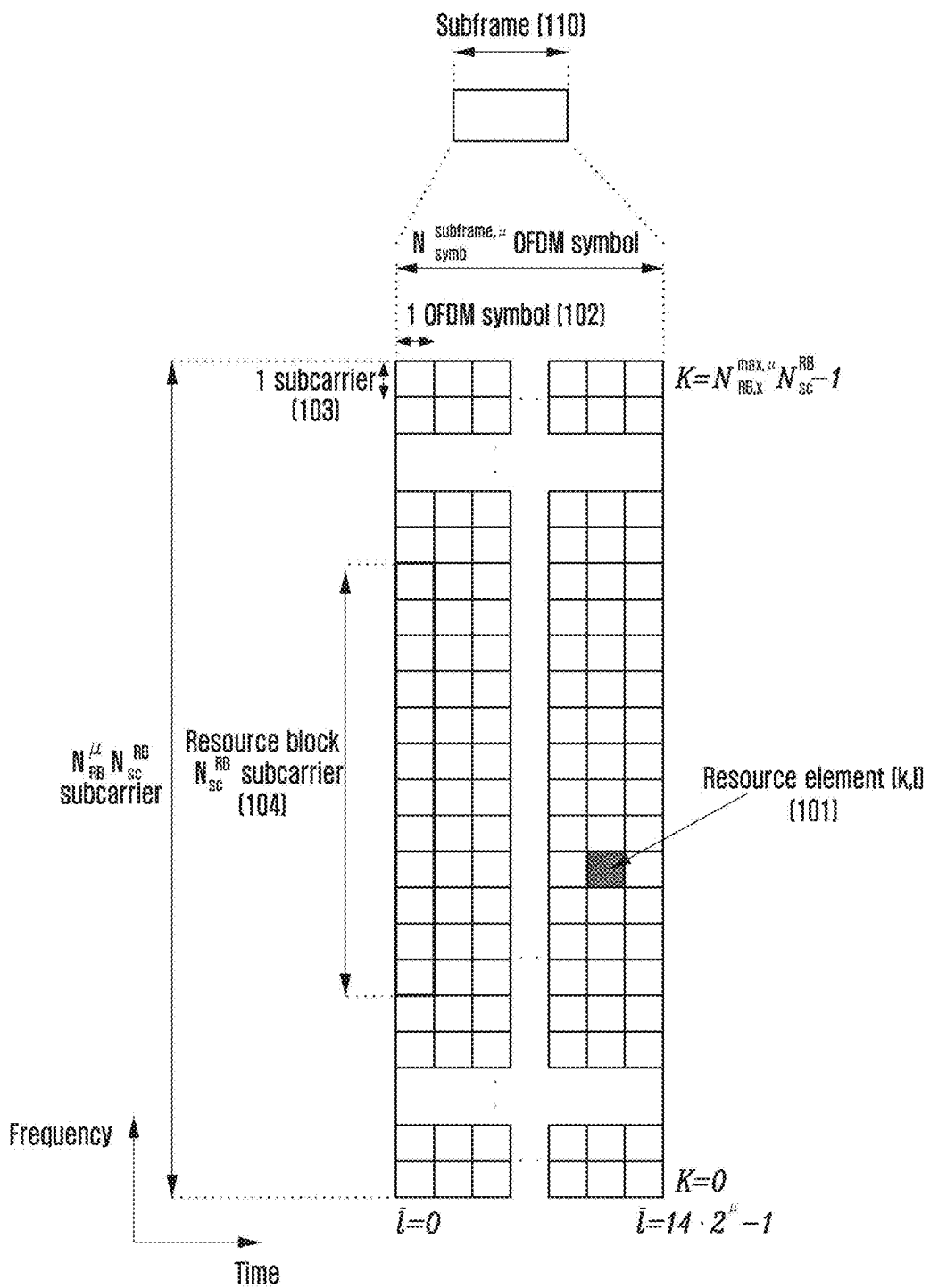
FIG. 1 is a diagram illustrating a basic structure of a time-frequency domain, which is a radio resource domain of a 5G system.

Hereinafter, embodiments of the disclosure will be described in detail with reference to the accompanying drawings.

In describing the embodiments, descriptions of technical contents that are well known in the technical field to which the disclosure pertains and that are not directly related to the disclosure will be omitted. This is to more clearly convey the gist of the disclosure without obscuring the gist of the disclosure by omitting unnecessary description.

For the same reason, some components are exaggerated, omitted, or schematically illustrated in the accompanying drawings. Further, the size of each component does not fully reflect the actual size. In each drawing, the same reference numerals are given to the same or corresponding components.

Advantages and features of the disclosure, and a method for achieving them will become apparent with reference to the embodiments described below in detail in conjunction with the accompanying drawings. However, the disclosure is not limited to the embodiments disclosed below, but may be implemented in various different forms, and only the present embodiments enable the disclosure to be complete, and are provided to fully inform the scope of the disclosure to those of ordinary skill in the art to which the disclosure pertains, and the disclosure is only defined by the scope of the claims. Like reference numerals refer to like components throughout the specification.

Further, in the description of the disclosure, when it is determined that a detailed description of a related function or configuration may unnecessarily obscure the subject matter of the disclosure, a detailed description thereof will be omitted. Terms described below are terms defined in consideration of functions in the disclosure, which may vary according to intentions or customs of users and operators. Therefore, the definition should be made based on the content throughout this specification.

Hereinafter, a base station is a subject performing resource allocation of a UE, and may be at least one of a gNode B, an eNode B, a node B, a base station (BS), a radio access unit, a base station controller, or a node on a network. The UE may include a user equipment (UE), a mobile station (MS), a cellular phone, a smart phone, a computer, or a multimedia system capable of performing a communication function. In the disclosure, a downlink (DL) is a wireless transmission path of a signal transmitted from a base station to a UE, and an uplink (UL) is a wireless transmission path of a signal transmitted from a UE to a base station. Further, hereinafter, although LTE or LTE-A system may be described as an example, embodiments of the disclosure may be applied to other communication systems having a similar technical background or channel type. For example, embodiments of the disclosure may be applied to 5G mobile communication technology (5G, new radio, NR) developed after LTE-A, and the following 5G may be a concept including existing LTE, LTE-A and other similar services. Further, the disclosure may be applied to other communication systems through some modifications within a range that does not significantly deviate from the scope of the disclosure by the determination of a person having skilled technical knowledge.

In this case, it will be understood that each block of flowcharts and combinations of the flowcharts may be performed by computer program instructions. Because these computer program instructions may be mounted in a processor of a general purpose computer, special purpose computer, or other programmable data processing equipment, the instructions performed by a processor of a computer or other programmable data processing equipment generate a means that performs functions described in the flowchart block(s). Because these computer program instructions may be stored in a computer usable or computer readable memory that may direct a computer or other programmable data processing equipment in order to implement a function in a particular manner, the instructions stored in the computer usable or computer readable memory may produce a production article containing instruction means for performing the function described in the flowchart block(s). Because the computer program instructions may be mounted on a computer or other programmable data processing equipment, a series of operational steps are performed on the computer or other programmable data processing equipment to generate a computer-executed process; thus, instructions for performing a computer or other programmable data processing equipment may provide steps for performing functions described in the flowchart block(s).

Further, each block may represent a module, a segment, or a portion of a code including one or more executable instructions for executing specified logical function(s). Further, it should also be noted that in some alternative implementations, functions recited in the blocks may occur out of order. For example, two blocks illustrated one after another may in fact be performed substantially simultaneously, or the blocks may be sometimes performed in the reverse order according to the corresponding function.

In this case, a term '-unit' used in this embodiment means software or hardware components such as a field programmable gate array (FPGA) or an application specific integrated circuit (ASIC), and '-unit' performs certain roles. However, '-unit' is not limited to software or hardware. '-unit' may be configured to reside in an addressable storage medium or may be configured to reproduce one or more processors. Therefore, as an example, '-unit' includes components such as software components, object-oriented software components, class components, and task components, processes, functions, properties, procedures, subroutines, segments of program code, drivers, firmware, microcode, circuitry, data, databases, data structures, tables, arrays, and variables. Functions provided in the components and '-units' may be combined into a smaller number of components and '-units' or may be further separated into additional components and '-units'. Further, components and '-units' may be implemented to reproduce one or more CPUs in a device or secure multimedia card. Further, in an embodiment, '~ unit' may include one or more processors.

Hereinafter, embodiments of the disclosure will be described in detail with reference to the accompanying drawings. Hereinafter, the embodiments of the disclosure will describe an mMTC service as an example for the method and device proposed in the embodiments of the disclosure, but are not limited to each embodiment and it will be possible to utilize all embodiments or a combination of some embodiments of one or more embodiments proposed in the disclosure for a random access method corresponding to another additional service and a method for repeated transmission of a random access channel preamble. Accordingly, the embodiments of the disclosure may be applied through some modifications within a range that does not significantly deviate from the scope of the disclosure by the determination of a person having skilled technical knowledge.

Further, in the description of the disclosure, when it is determined that a detailed description of a related function or configuration may unnecessarily obscure the gist of the disclosure, a detailed description thereof will be omitted. Further, terms described below are terms defined in consideration of functions in the disclosure, which may vary according to intentions or customs of users and operators. Therefore, the definition should be made based on the content throughout this specification.

A wireless communication system has evolved from providing voice-oriented services in the early days to a broadband wireless communication system that provides high-speed and high-quality packet data services such as communication standards such as, for example, high speed packet access (HSPA), long term evolution (LTE) or evolved universal terrestrial radio access (E-UTRA), LTE-Advanced (LTE-A), and LTE-Pro of 3GPP, high rate packet data (HRPD), ultra mobile broadband (UMB) of 3GPP2, and IEEE 802.16e.

As a representative example of the broadband wireless communication system, an LTE system employs an orthogonal frequency division multiplexing (OFDM) scheme in a downlink (DL) and a single carrier frequency division multiple access (SC-FDMA) scheme in an uplink. The uplink means a radio link in which a user equipment (UE) or a mobile station (MS) transmits data or control signals to an eNode B (eNB) or a base station(BS), and the downlink means a wireless link in which a base station transmits data or control signals to a terminal. Further, the above-mentioned multiple access method enables data or control information of each user to distinguish by allocating and operating data or control information so that time-frequency resources to carry data or control information for each user in general do not overlap each other, that is, so that orthogonality is established.

A 5G communication system, which is a communication system after LTE, should support services that simultaneously satisfy various requirements so that various requirements of users and service providers can be freely reflected. Services considered for the 5G communication system include enhanced mobile broadband (eMBB), massive machine type communication (mMTC), ultra reliability low latency communication (URLLC), and the like.

The eMBB aims to provide more improved data transfer rates than data transfer rates supported by existing LTE, LTE-A, or LTE-Pro. For example, in the 5G communication system, the eMBB should be able to provide a peak data rate of 20 Gbps in a downlink and a peak data rate of 10 Gbps in an uplink from the viewpoint of one base station. Further, the 5G communication system should provide an increased user perceived data rate of a UE while providing a peak data rate. In order to satisfy such a requirement, it may be required to improve various transmission and reception technologies, including more advanced multi-input and multi-output (MIMO) transmission technology. Further, the LTE system transmits a signal using a transmission bandwidth of up to 20 MHz in the 2 GHz band, whereas the 5G communication system can satisfy a data transmission rate required by the 5G communication system by using a frequency bandwidth wider than 20 MHz in a frequency band of 3 to 6 GHz or 6 GHz or more.

At the same time, mMTC is being considered to support application services such as Internet of Thing (IoT) in the 5G communication system. In order to efficiently provide Internet of Things, mMTC requires access support for large-scale terminals within a cell, improvement of coverage of UEs, an improved battery life, and cost reduction of UEs. Because the Internet of Things is attached to various sensors and various devices to provide communication functions, it should be able to support a large number of UEs (e.g., 1,000,000 UEs/km$^2$) within a cell. Further, because a UE supporting mMTC is highly likely to be located in a shaded area that a cell cannot cover, such as the basement of a building, due to the nature of the service, the UE requires wider coverage compared to other services provided by the 5G communication system. The UE supporting mMTC should be configured with a low-cost UE, and because it is difficult to frequently exchange a battery of the UE, a very long battery life time such as 10 to 15 years is required.

Lastly, URLLC is a cellular-based wireless communication service used for mission-critical. For example, a service used for remote control of a robot or machinery, industrial automation, unmanned aerial vehicle, remote health care, emergency alert, and the like may be considered. Therefore, communication provided by URLLC should provide very low latency and very high reliability. For example, a service supporting URLLC should satisfy air interface latency smaller than 0.5 milliseconds and should simultaneously satisfy the requirement of a packet error rate of 10$^{-5}$ or less. Therefore, for a service supporting URLLC, the 5G system should provide a transmit time interval (TTI) smaller than that of other services, and should simultaneously allocate a wide resource in a frequency band in order to secure reliability of a communication link.

Three services, i.e., eMBB, URLLC, and mMTC of the 5G communication system (hereinafter, may be interchanged with the 5G system) may be multiplexed and transmitted in one system. In this case, in order to satisfy different requirements of each service, different transmission and reception techniques and transmission and reception parameters may be used between services.

Hereinafter, a frame structure of a 5G system will be described in more detail with reference to the drawings.

FIG. 1 is a diagram illustrating a basic structure of a time-frequency domain, which is a radio resource domain of a 5G system.

In FIG. 1, a horizontal axis represents a time domain, and a vertical axis represents a frequency domain. A basic unit of a resource in the time and frequency domains is a resource element (RE) 101, and may be defined as one orthogonal frequency division multiplexing (OFDM) symbol (or discrete Fourier transform spread OFDM (DFT-s-OFDM) symbol) 102 on the time axis and one subcarrier 103 on the frequency axis. In the frequency domain, the $N_{SC}^{RB}$ (e.g., 12) number of consecutive REs may constitute one resource block (RB) 104. Further, in the time domain, the $N_{symb}^{subframe}$ number of consecutive OFDM symbols may constitute one subframe 110.

Figure 2:
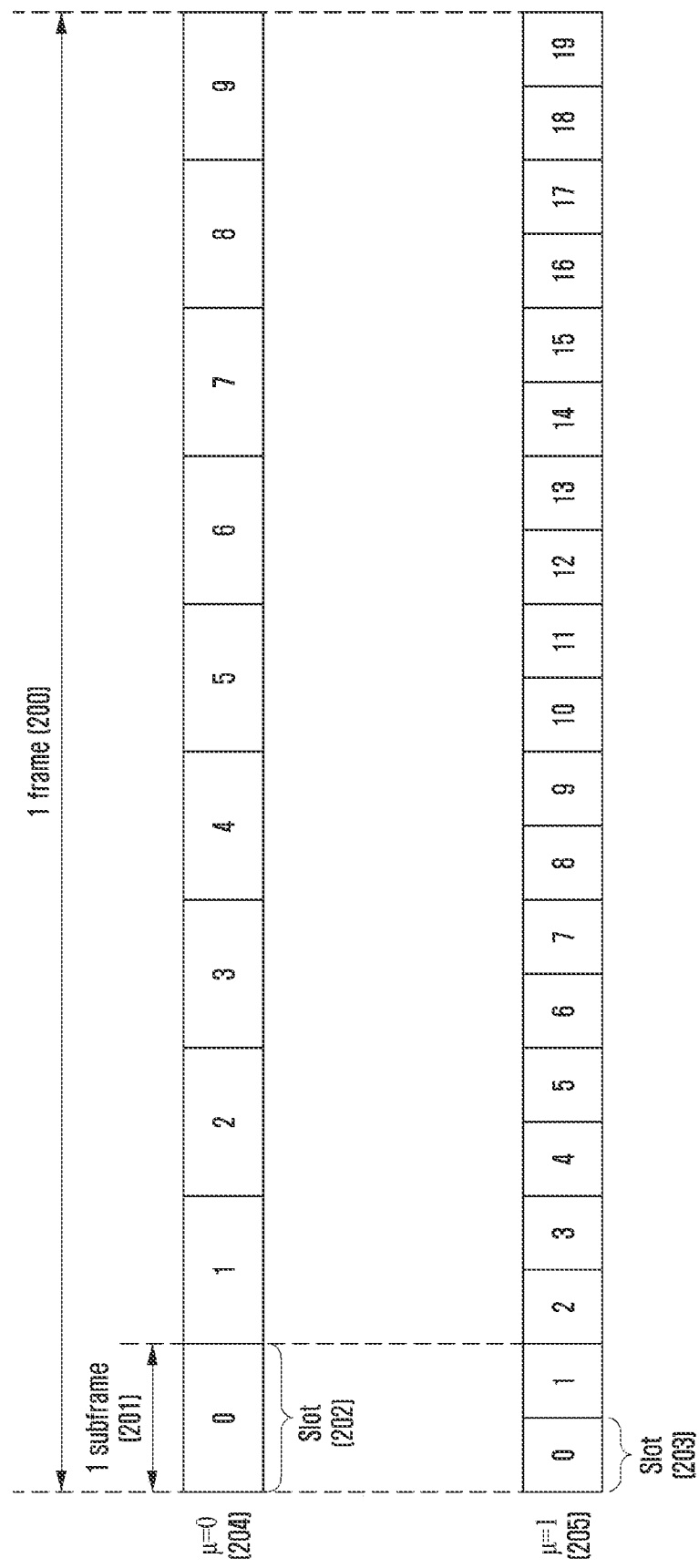
FIG. 2 is a diagram illustrating a slot structure considered in a 5G system.

FIG. 2 is a diagram illustrating a slot structure considered in a 5G system. FIG. 2 illustrates an example of a structure of a frame 200, a subframe 201, and a slot 202. One frame 200 may be defined as 10 ms. One subframe 201 may be defined as 1 ms; thus, one frame 200 may be configured with total 10 subframes 201. Further, one slot 202 and 203 may be defined as 14 OFDM symbols (i.e., the number $N_{symb}^{slot}$ of symbols per slot is 14). One subframe 201 may be configured with one or a plurality of slots 202 and 203, and the number of slots 202 and 203 per subframe 201 may be different according to μ (204, 205), which is a configuration value for subcarrier spacing.

An example of FIG. 2 illustrates a slot structure in the case of μ=0 (204) and μ=1 (205) as a subcarrier spacing configuration value. When μ=0 (204), one subframe 201 may be configured with one slot 202, and when μ=1 (205), one subframe 201 may be configured with two slots 203. That is, the number $N_{slot}^{subframe,\mu}$ of slots per subframe may vary according to the configuration value μ for the subcarrier spacing, and accordingly, the number $N_{slot}^{frame,\mu}$ of slots per frame may vary. $N_{slot}^{subframe,\mu}$ and $N_{slot}^{frame,\mu}$ according to each subcarrier spacing configuration p may be defined in Table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

The 5G wireless communication system may transmit a synchronization signal block (may be mixed with an SSB, SS block, SS/PBCH block, and the like) for initial access may be transmitted, and the synchronization signal block may be configured with a primary synchronization signal (PSS), a secondary synchronization signal (SSS), and a physical broadcast channel (PBCH). In an initial access step in which the terminal accesses the system for the first time, the terminal first obtains a downlink time and frequency domain synchronization from a synchronization signal through cell search, and obtains a cell ID. The synchronization signal includes a PSS and an SSS. The UE receives the PBCH for transmitting a master information block (MIB) from the base station, and obtains system information related to transmission and reception, such as system bandwidth or related control information, and basic parameter values. The terminal performs decoding on the PDCCH and the PDSCH to obtain a system information block (SIB) based on the information. Thereafter, the UE exchanges an identity with the base station through a random access step, and initially accesses the network through steps such as registration and authentication. Hereinafter, a cell initial access operation procedure of the 5G wireless communication system will be described in more detail with reference to the drawings.

The synchronization signal is a signal to be a reference for cell search and is transmitted by applying subcarrier spacing appropriate to a channel environment such as phase noise for each frequency band. A 5G base station may transmit a plurality of synchronization signal blocks according to the number of analog beams to be operated. The PSS and SSS may be mapped and transmitted over 12 RBs, and the PBCH may be mapped and transmitted over 24 RBs. Hereinafter, a structure in which a synchronization signal and a PBCH are transmitted in a 5G communication system will be described.

Figure 3:
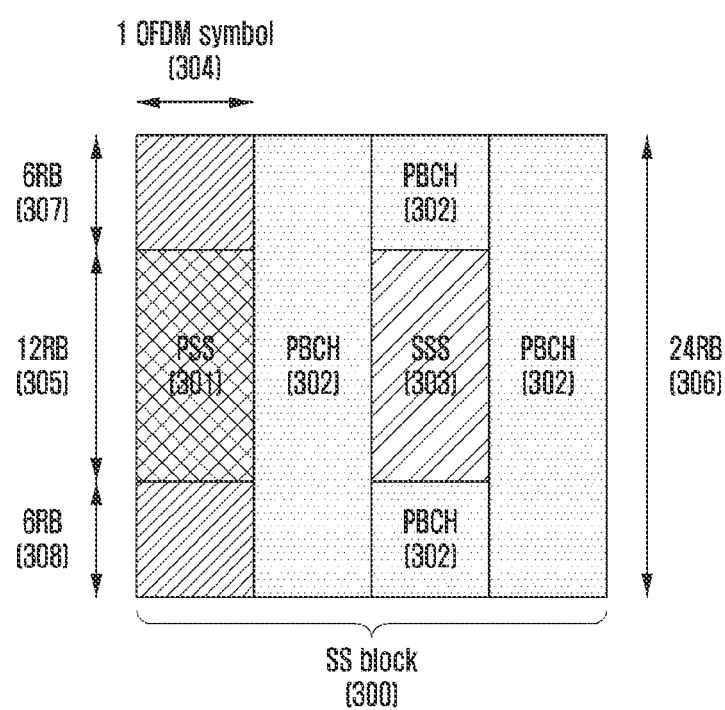
FIG. 3 is a diagram illustrating a synchronization signal block considered in a 5G communication system.

FIG. 3 is a diagram illustrating a synchronization signal block considered in a 5G communication system.

According to FIG. 3, a synchronization signal block 300 includes a PSS 301, an SSS 303, and a broadcast channel (PBCH) 302.

As illustrated, the synchronization signal block 300 is mapped to four OFDM symbols on the time axis. The PSS 301 and the SSS 303 may be transmitted in 12 RBs 305 on the frequency axis and first and third OFDM symbols on the time axis, respectively.

In the 5G system, total 1008 different cell IDs may be defined, the PSS 301 may have 3 different values and the SSS 303 may have 336 different values according to a physical layer ID of the cell. The UE may obtain one of 1008 cell IDs with a combination of the PSS 301 and the SSS 303 through detection. This may be represented by Equation 1.

$$N_{ID}^{cell}=3N_{ID}^{(1)}+N_{ID}^{(2)} \quad [\text{Equation 1}]$$

$N^{(1)}_{ID}$ may be estimated from the SSS 303 and has a value between 0 and 335. $N^{(2)}_{ID}$ may be estimated from the PSS 301 and has a value between 0 and 2. A value of $N^{cell}_{ID}$, which is a cell ID, may be estimated with a combination of $N^{(1)}_{ID}$ and $N^{(2)}_{ID}$.

The PBCH 302 may be transmitted in a resource including 6 RBs 307 and 308 at both sides except for 12 RBs while the SSS 303 is transmitted in the second to fourth OFDM symbols of the SS block on the time axis and 24 RBs 306 on the frequency axis. In the PBCH 302, various system information called MIB may be transmitted, and more specifically, the MIB includes information, as illustrated in Table 2, and a PBCH payload and a PBCH demodulation reference signal (DMRS) includes the following additional information.

TABLE 2

| | |
|---|---|
| MIB ::= SEQUENCE { | |
| systemFrameNumber | BIT STRING (SIZE (6)), |
| subCarrierSpaeingCommon scs30or120}, | ENUMERATED {ses15or60, |
| ssb-SubearrierOffset | INTEGER (0..15), |
| dmrs-TypeA-Position | ENUMERATED {pos2, pos3}, |
| pdcch-ConfigSIB I | PDCCH-ConfigSIB1, |
| cellBarred | ENUMERATED {barred, notBarred}, |
| intraFregReselectiort | ENUMERATED {allowed, notAllowed}, |
| spare | BIT STRING (SIZE (I)) |
| } | |

Synchronization signal block information: Offset of a frequency domain of a synchronization signal block is indicated through 4 bits (ssb-SubcarrierOffset) in the MIB. An index of the synchronization signal block including the PBCH may be indirectly obtained through decoding of the PBCH DMRS and PBCH. More specifically, in a frequency band of 6 GHz or less, 3 bits obtained through decoding of the PBCH DMRS indicate a synchronization signal block index, and in a frequency band of 6 GHz or more, total 6 bits of 3 bits obtained through decoding of the PBCH DMRS and 3 bits included in the PBCH payload to be obtained in PBCH decoding indicate a synchronization signal block index including the PBCH. —Physical downlink control channel (PDCCH) information: subcarrier spacing of a common downlink control channel is indicated through 1 bit (subCarrierSpacingCommon) in the MIB, and time-frequency resource configuration information of a control resource set (CORESET) and a search space (SS) is indicated through 8 bits (pdcch-ConfigSIB1).

System frame number (SFN): 6 bits (systemFrameNumber) in the MIB are used for indicating a part of the SFN. Least significant bit (LSB) 4 bits of the SFN are included in the PBCH payload so that the terminal may indirectly obtain it through PBCH decoding.

Timing information in a radio frame: the terminal may indirectly identify whether the synchronization signal block has been transmitted in a first or second half frame of the radio frame with 1 bit (half frame) included in the above-described synchronization signal block index and PBCH payload to be obtained through PBCH decoding.

Because a transmission bandwidth 12 RB, 305 of the PSS 301 and the SSS 303 and a transmission bandwidth 24 RB, 306 of the PBCH 302 are different from each other, in a first OFDM symbol in which the PSS 301 is transmitted within the transmission bandwidth of the PBCH 302, while the PSS 301 is transmitted, 6 RBs 307 and 308 exist at both sides except for 12 RBs, and the area may be used for transmitting other signals or may be empty.

All synchronization signal blocks may be transmitted using the same analog beam. That is, all the PSS 301, the SSS 303, and the PBCH 302 may be transmitted using the same beam. Because the analog beam has a characteristic that cannot be otherwise applied to the frequency axis, the same analog beam is applied to all frequency axis RBs within a specific OFDM symbol to which a specific analog beam is applied. That is, all four OFDM symbols in which the PSS 301, the SSS 303, and the PBCH 302 are transmitted may be transmitted using the same analog beam.

Figure 4:
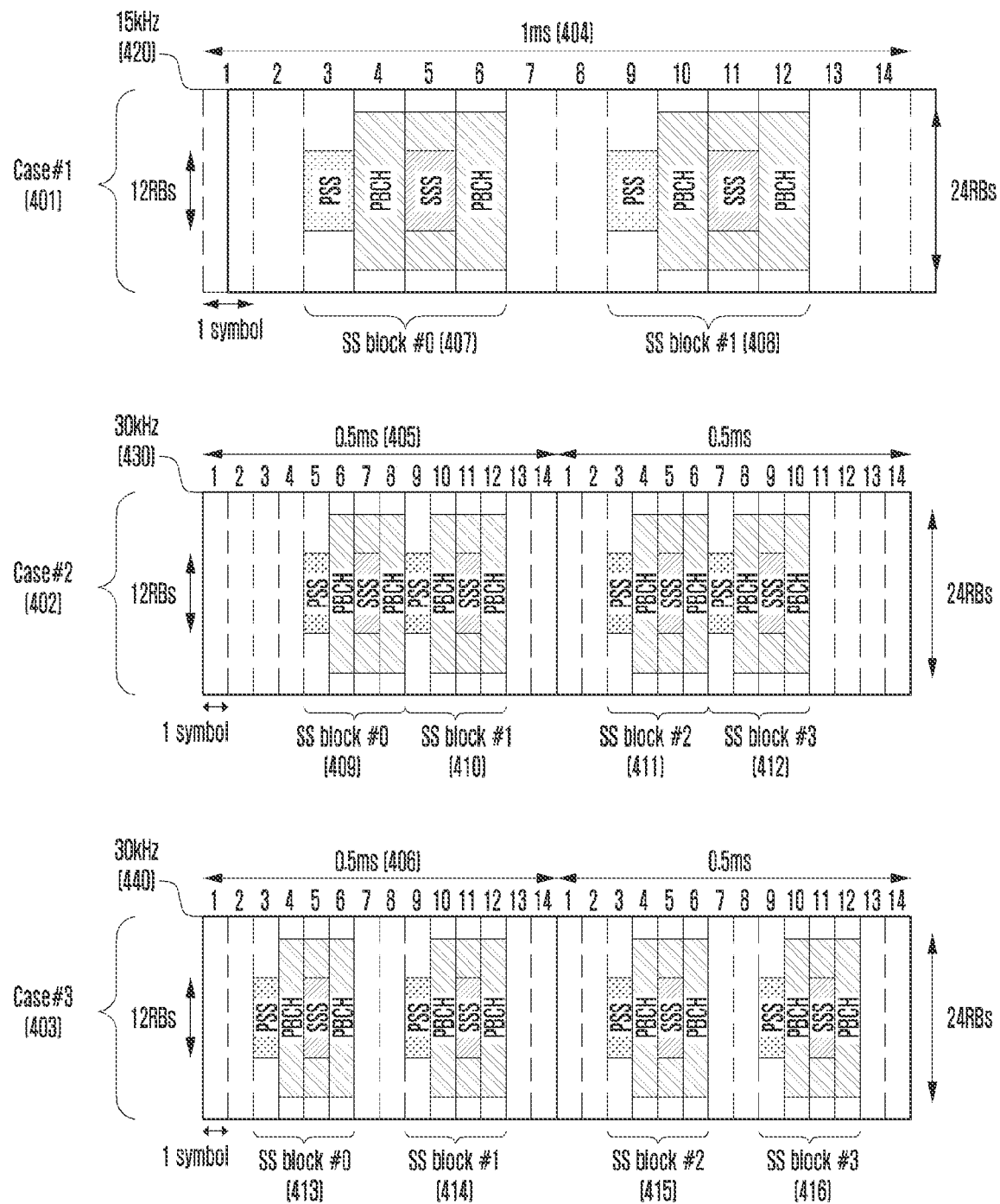
FIG. 4 is a diagram illustrating transmission cases of a synchronization signal block in a frequency band of 6 GHz or less considered in a 5G communication system.

FIG. 4 is a diagram illustrating transmission cases of a synchronization signal block in a frequency band of 6 GHz or less considered in a 5G communication system. In the 5G communication system, in a frequency band of 6 GHz or less, subcarrier spacing (SCS) of 15 kHz (420) and subcarrier spacing of 30 kHz (430, 440) may be used for synchronization signal block transmission. At subcarrier spacing of 15 kHz, there is one transmission case (case #1) 401 for the synchronization signal block, and at subcarrier spacing of 30 kHz, there are two transmission cases (case #2 and case #3) 402 and 403 for the synchronization signal block.

In the case #1, 401 at subcarrier spacing of 15 kHz (420), up to two synchronization signal blocks may be transmitted within a time of 1 ms (404) (or, when 1 slot is configured with 14 OFDM symbols, it corresponds to a 1 slot length). An example of FIG. 4 illustrates the synchronization signal block #0, 407 and the synchronization signal block #1, 408. In this case, the synchronization signal block #0, 407 may be mapped to four consecutive symbols in a third OFDM symbol, and the synchronization signal block #1, 408 may be mapped to four consecutive symbols in a ninth OFDM symbol.

Different analog beams may be applied to the synchronization signal block #0, 407 and the synchronization signal block #1, 408. Accordingly, the same beam may be applied to all of 3rd to 6th OFDM symbols to which the synchronization signal block #0, 407 is mapped, and the same beam may be applied to all of 9th to 12th OFDM symbols to which the synchronization signal block #1, 408 is mapped. In 7th, 8th, 13th, and 14th OFDM symbols to which the synchronization signal block is not mapped, which beam will be used may be freely determined under the determination of the base station.

In the case #2, 402 at subcarrier spacing of 30 kHz (430), up to two synchronization signal blocks may be transmitted within a time of 0.5 ms (405) (or when 1 slot is configured with 14 OFDM symbols, it corresponds to a 1 slot length), and accordingly, up to 4 synchronization signal blocks may be transmitted within a time of 1 ms (or when 1 slot is configured with 14 OFDM symbols, it corresponds to a 2 slot length). An example of FIG. 4 illustrates a case in which a synchronization signal block #0, 409, a synchronization signal block #1, 410, a synchronization signal block #2, 411, and a synchronization signal block #3, 412 are transmitted within 1 ms (i.e., two slots). In this case, the synchronization signal block #0, 409 and the synchronization signal block #1, 410 may be mapped from a 5th OFDM symbol and a 9th OFDM symbol, respectively of the first slot, and the synchronization signal block #2, 411 and the synchronization signal block #3, 412 may be mapped from a third OFDM symbol and a seventh OFDM symbol, respectively of the second slot.

Different analog beams may be applied to the synchronization signal block #0, 409, the synchronization signal block #1, 410, the synchronization signal block #2, 411, and the synchronization signal block #3, 412. Accordingly, the same analog beam may be applied to each of 5th to 8th OFDM symbols of a first slot in which the synchronization signal block #0, 409 is transmitted, 9th to 12th OFDM symbols of the first slot in which the synchronization signal block #1, 410 is transmitted, 3rd to 6th symbols of a second slot in which the synchronization signal block #2, 411 is transmitted, and 7th to 10th symbols of the second slot in which the synchronization signal block #3, 412 is transmitted. In OFDM symbols to which a synchronization signal block is not mapped, which beam will be used may be freely determined under the determination of the base station.

In the case #3, 403 at subcarrier spacing of 30 kHz 440, up to two synchronization signal blocks may be transmitted within a time of 0.5 ms (406) (or when 1 slot is configured with 14 OFDM symbols, it corresponds to a 1 slot length), and accordingly, up to 4 synchronization signal blocks may be transmitted within a time of 1 ms (or, when 1 slot is configured with 14 OFDM symbols, it corresponds to a 2 slot length). An example of FIG. 4 illustrates that the synchronization signal block #0, 413, the synchronization signal block #1, 414, the synchronization signal block #2, 415, and the synchronization signal block #3, 416 are transmitted in 1 ms (i.e., two slots). In this case, the synchronization signal block #0, 413 and the synchronization signal block #1, 414 may be mapped from a 3rd OFDM symbol and a 9th OFDM symbol, respectively of the first slot, and the synchronization signal block #2, 415 and the synchronization signal block #3, 416 may be mapped from a third OFDM symbol and a ninth OFDM symbol, respectively of the second slot.

Different analog beams may be used for the synchronization signal block #0, 413, the synchronization signal block #1, 414, the synchronization signal block #2, 415, and the synchronization signal block #3, 416, respectively. As described above, the same analog beam may be used in all four OFDM symbols in which each synchronization signal block is transmitted, and which beam is to be used in OFDM symbols to which the synchronization signal block is not mapped may be freely determined under the determination of the base station.

Figure 5:
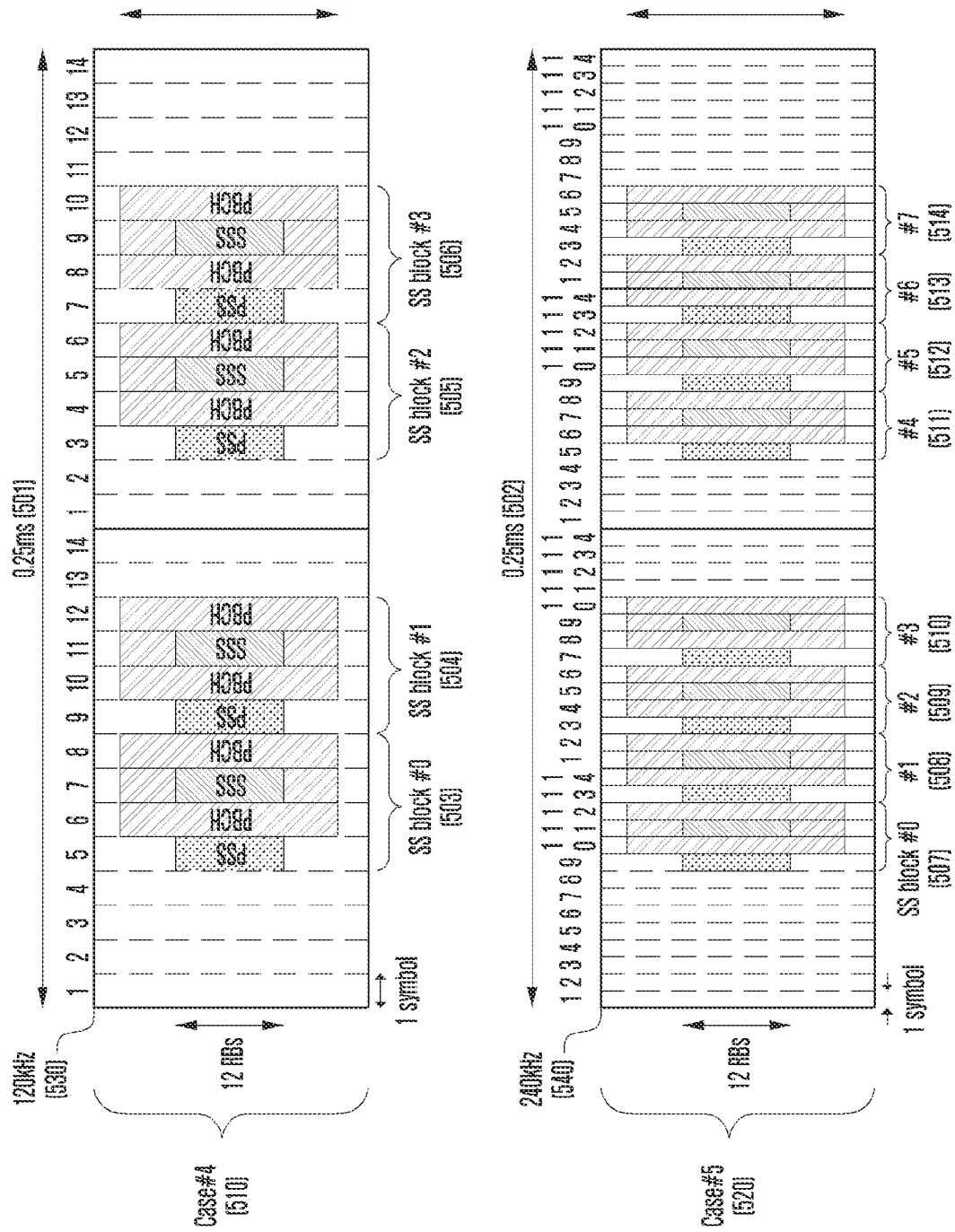
FIG. 5 is a diagram illustrating transmission cases of a synchronization signal block in a frequency band of 6 GHz or more considered in a 5G communication system.

FIG. 5 is a diagram illustrating transmission cases of a synchronization signal block in a frequency band of 6 GHz or more considered in a 5G communication system. In the 5G communication system, in a frequency band of 6 GHz or more, subcarrier spacing of 120 kHz (530) and subcarrier spacing of 240 kHz (540) may be used for synchronization signal block transmission.

In a case #4, 510 at subcarrier spacing of 120 kHz (530), up to 4 synchronization signal blocks may be transmitted within a time of 0.25 ms (501) (or, when 1 slot is configured with 14 OFDM symbols, it corresponds to a 2 slot length). An example of FIG. 5 illustrates a case in which a synchronization signal block #0, 503, a synchronization signal block #1, 504, a synchronization signal block #2, 505, and a synchronization signal block #3, 506 are transmitted at 0.25 ms (i.e., two slots). In this case, the synchronization signal block #0, 503 and the synchronization signal block #1, 504 may be mapped from a 5th OFDM symbol and a 9th OFDM symbol, respectively of the first slot, and the synchronization signal block #2, 505 and the synchronization signal block #3, 506 may be mapped from a third OFDM symbol and a seventh OFDM symbol, respectively of the second slot.

As described above, different analog beams may be used for each of the synchronization signal block #0, 503, the synchronization signal block #1, 504, the synchronization signal block #2, 505, and the synchronization signal block #3, 506. The same analog beam may be used in all four OFDM symbols in which each synchronization signal block is transmitted, and which beam will be used in OFDM symbols to which the synchronization signal block is not mapped may be freely determined under the determination of the base station.

In a case #5, 520 at subcarrier spacing of 240 kHz (540), up to 8 synchronization signal blocks may be transmitted within a time of 0.25 ms (502) (or when 1 slot is configured with 14 OFDM symbols, it corresponds to a length of 4 slots). An example of FIG. 5 illustrates a case in which a synchronization signal block #0, 507, a synchronization signal block #1, 508, a synchronization signal block #2, 509, a synchronization signal block #3, 510, a synchronization signal block #4, 511, a synchronization signal block #5, 512, a synchronization signal block #6, 513, and a synchronization signal block #7, 514 are transmitted in 0.25 ms (i.e., 4 slots). In this case, the synchronization signal block #0, 507 and the synchronization signal block #1, 508 may be mapped from a ninth OFDM symbol and a thirteenth OFDM symbol, respectively of the first slot, and the synchronization signal block #2, 509 and the synchronization signal block #3, 510 may be mapped from a third OFDM symbol and a seventh OFDM symbol, respectively of the second slot, and the synchronization signal block #4, 511, the synchronization signal block #5, 512, and the synchronization signal block #6, 513 may be mapped from a 5th OFDM symbol, a 9th OFDM symbol, and a 13th OFDM symbol, respectively of the third slot, and the synchronization signal block #7, 514 may be mapped from a 3rd OFDM symbol of a 4th slot.

As described above, different analog beams may be used for each of the synchronization signal block #0, 507, the synchronization signal block #1, 508, the synchronization signal block #2, 509, the synchronization signal block #3, 510, the synchronization signal block #4, 511, the synchronization signal block #5, 512, the synchronization signal block #6, 513, and the synchronization signal block #7, 514. The same analog beam may be used in all four OFDM symbols in which each synchronization signal block is transmitted, and in OFDM symbols to which the synchronization signal block is not mapped, which beam will be used may be freely determined under the determination of the base station.

Figure 6:
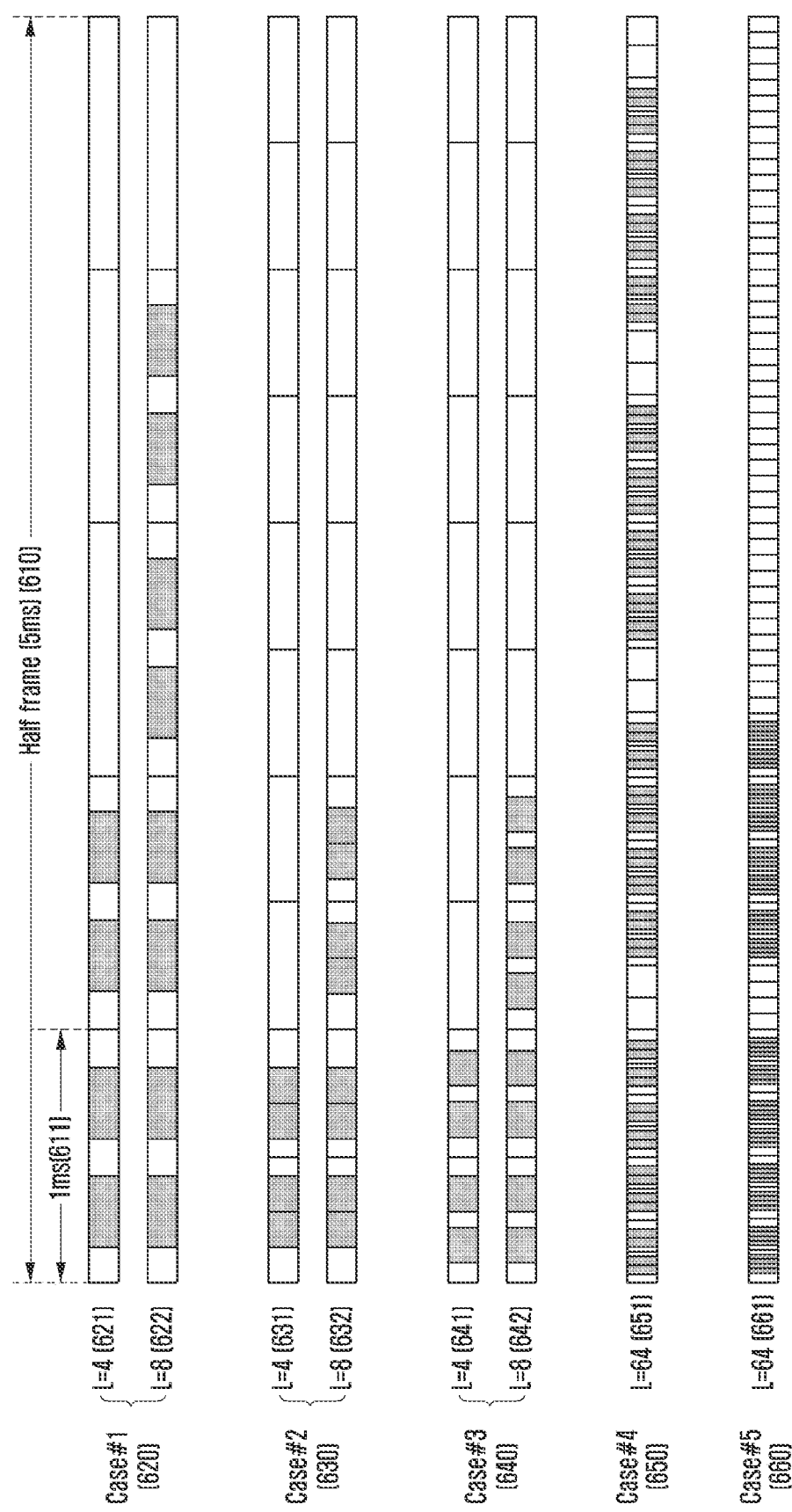
FIG. 6 is a diagram illustrating transmission cases of a synchronization signal block according to subcarrier spacing within a time of 5 ms.

FIG. 6 is a diagram illustrating transmission cases of a synchronization signal block according to subcarrier spacing within a time of 5 ms. In the 5G communication system, a synchronization signal block is periodically transmitted in units of 5 ms (corresponds to 5 subframes or half frames) 610.

In a frequency band of 3 GHz or less, up to four synchronization signal blocks may be transmitted within a time of 5 ms (610). In a frequency band of 3 GHz or more and 6 GHz or less, up to 8 synchronization signal blocks may be transmitted. In a frequency band of 6 GHz or more, up to 64 synchronization signal blocks may be transmitted. As described above, subcarrier spacing of 15 kHz and 30 kHz may be used at a frequency of 6 GHz or less.

In an example of FIG. 6, because a case #1, 401 at subcarrier spacing of 15 kHz configured with one slot of FIG. 4 may be mapped to a first slot and a second slot in a frequency band of 3 GHz or less, up to four synchronization signal blocks 621 may be transmitted, and because a case #1, 401 may be mapped to first, second, third, and fourth slots in a frequency band of 3 GHz or more and 6 GHz or less, up to 8 synchronization signal blocks 622 may be transmitted. Because a case #2, 402 or a case #3, 403 at subcarrier spacing of 30 kHz configured with two slots in FIG. 4 may be mapped starting with the first slot in a frequency band of 3 GHz or less, up to 4 synchronization signal blocks 631 and 641 may be transmitted, and because the case #2, 402 or the case #3, 403 may be mapped starting with first and third slots in a frequency band of 3 GHz or more and 6 GHz or less, up to 8 synchronization signal blocks 632 and 642 may be transmitted.

Subcarrier spacing of 120 kHz and 240 kHz may be used at a frequency of 6 GHz or more. In an example of FIG. 6, because a case #4, 510 at subcarrier spacing of 120 kHz configured with two slots of FIG. 5 may be mapped starting with 1st, 3rd, 5th, 7th, 11th, 13rd, 15th, 17th, 21st, 23rd, 25th, 27th, 31st, 33rd, 35th, and 37th slots in a frequency band of 6 GHz or more, up to 64 synchronization signal blocks 651 may be transmitted. In the example of FIG. 6, because a case #5, 520 at subcarrier spacing of 240 kHz configured with 4 slots of FIG. 5 may be mapped starting with 1st, 5th, 9th, 13rd, 21st, 25th, 29th, and 33rd slots in a frequency band of 6 GHz or more, up to 64 synchronization signal blocks 661 may be transmitted.

The UE may decode the PDCCH and the PDSCH based on system information included in the received MIB and then obtain an SIB. The SIB includes at least one of an uplink cell bandwidth, a random access parameter, a paging parameter, or a parameter related to uplink power control. The UE may form a radio link with the network through a random access process based on system information and synchronization with the network obtained in a cell search process of the cell. For random access, a contention-based or contention-free method may be used. In an initial access step of the cell, when the UE performs cell selection and reselection, a contention-based access method may be used for purposes such as moving from an RRC_IDLE state to an RRC_CONNECTED state. Contention-free random access may be used for reconfiguring uplink synchronization when downlink data arrives, in the case of handover, or in the case of location measurement.

Figure 7:
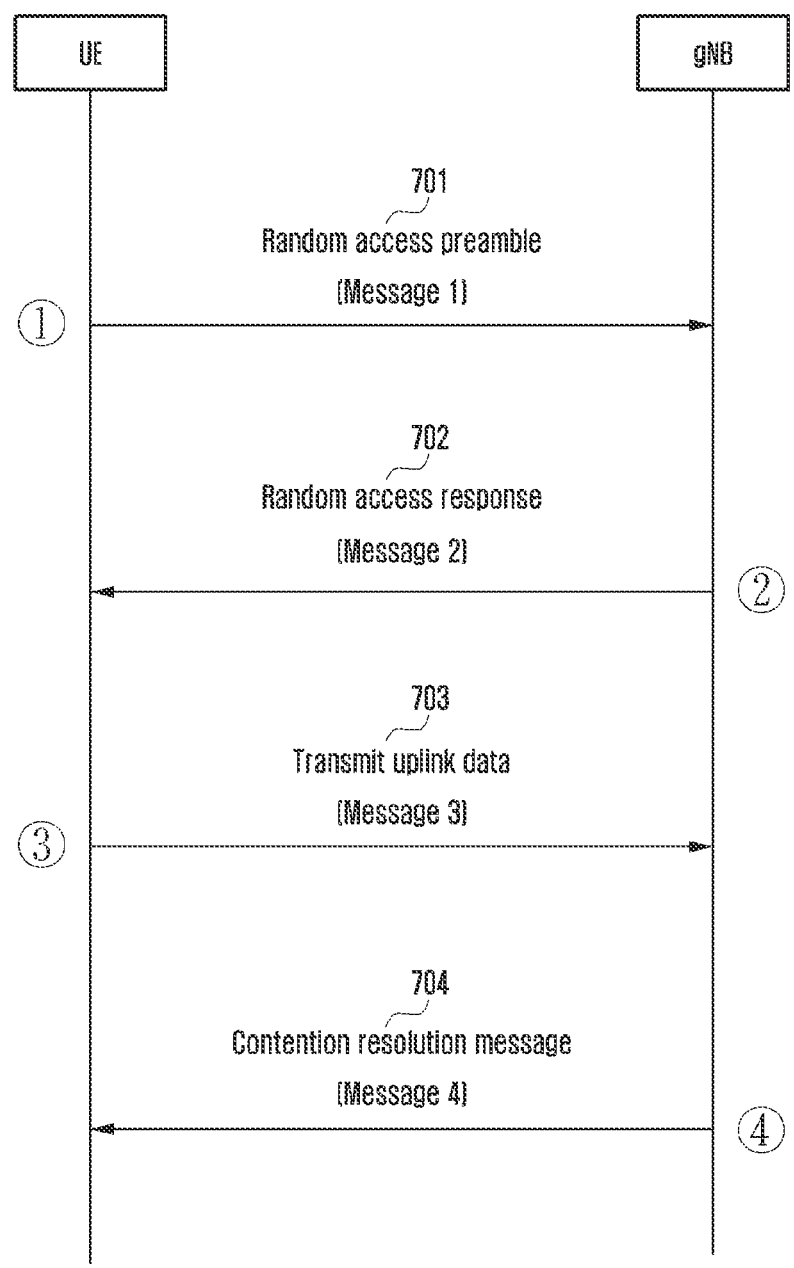
FIG. 7 is a message flow diagram illustrating a four-step random access procedure.

Hereinafter, a 4-step RACH procedure will be described in detail with reference to FIG. 7. FIG. 7 is a message flow diagram illustrating a four-step random access procedure. Referring to FIG. 7, in first step 701 of the random access procedure, the UE transmits a random access preamble (or message 1) to the base station. Therefore, the base station measures a transmission delay value between the terminal and the base station and performs uplink synchronization. In this case, the UE transmits a random access preamble arbitrarily selected within a random access preamble set given by system information in advance. Initial transmission power of the random access preamble is determined according to a pathloss between the base station and the UE measured by the UE. Further, the terminal determines a transmission beam direction (or transmission beam or beam) of a random access preamble based on a synchronization signal (or SSB) received from the base station, and transmits the random access preamble by applying the determined transmission beam direction.

In second step 702, the base station transmits a response (random access response, RAR, or message 2) to the detected random access attempt to the UE. The base station transmits an uplink transmission timing control command to the UE by a transmission delay value measured from the random access preamble received in the first step. Further, the base station transmits an uplink resource and a power control command to be used by the UE as scheduling information. The scheduling information may include control information on an uplink transmission beam of the terminal. The RAR is transmitted through the PDSCH and includes the following information.

Random access preamble sequence index detected by the network (or base station)
  TC-RNTI(temporary cell radio network temporary identifier)
  Uplink scheduling grant
  Timing advance value If the terminal does not receive the RAR, which is scheduling information on a message 3 from the base station for a predetermined time in second step 702, the first step 701 is performed again. When the first step is performed again, the UE increases transmission power of the random access preamble by a predetermined step and transmits the random access preamble (this is referred to as power ramping), thereby increasing a random access preamble reception probability of the base station.

In third step 703, the terminal transmits uplink data (scheduled transmission or message 3) including a terminal identifier thereof to the base station through a physical uplink shared channel (PUSCH) using the uplink resources allocated in the second step 702. A transmission timing of the uplink data channel for transmitting the message 3 follows an uplink transmission timing control command received from the base station in the second step 702. Further, transmission power of the uplink data channel for transmitting the message 3 is determined in consideration of the power control command received from the base station in the second step 702 and a power ramping value of the random access preamble. The uplink data channel for transmitting the message 3 is a first uplink data signal transmitted by the UE to the base station after the UE transmits the random access preamble.

Finally, when the base station determines that the terminal has performed random access without collision with other UEs in fourth step 704, the base station transmits data (contention resolution message or message 4) including an identifier of the terminal that has transmitted the uplink data to the corresponding UE in the third step 703. When the UE receives the signal transmitted by the base station in the fourth step 704 from the base station, the UE determines that the random access is successful. The UE transmits HARQ-ACK/NACK indicating whether the message 4 has been successfully received to the base station through a physical uplink control channel (PUCCH).

When the base station fails to receive a data signal from the UE because data transmitted by the UE in the third step 703 collide with data of the other UE, the base station does not perform any further data transmission to the UE. Accordingly, when the UE does not receive data transmitted from the base station in the fourth step 704 for a predetermined period of time, the UE determines that the random access procedure has failed and starts again from the first step 701.

As described above, in the first step 701 of the random access procedure, the UE may transmit the random access preamble on the PRACH. Each cell has 64 available preamble sequences, and 4 long preamble formats and 9 short preamble formats may be used according to a transmission type. The UE generates 64 preamble sequences using a root sequence index and a cyclic shift value signaled as system information, and randomly selects one sequence and uses it as a preamble.

The network may notify the terminal of which time-frequency resource may be used for a PRACH using the SIB or higher signaling. The frequency resource indicates to the UE a start RB point of transmission, and the number of use RBs is determined according to the preamble format and the applied subcarrier spacing. The time resource may notify a preconfigured PRACH configuration period, a start symbol and a subframe index including a PRACH occasion (this may be mixed with an occasion), and the number of PRACH occasions in the slot through a PRACH configuration index (0 to 255), as illustrated in Table 3. Through the PRACH configuration index, the random access configuration information included in the SIB, and the index of the SSB selected by the UE, the terminal may identify time and frequency resources to transmit the random access preamble, and transmit the selected sequence as the preamble to the base station.

a low-cost UE. Further, it is possible to apply single antenna technology instead of MIMO technology, thereby minimizing power consumption. Further, because the existing LTE network may be used as it is, the existing LTE service and LTE-MTC service can be supported simultaneously without additional investment.

In this case, in order not to have any effect on the UE supported by the existing LTE service, the base station indicates that a cell transmitted a PBCH also supports the LTE-MTC service by including additional information in the remaining bits of the MIB included in the PBCH for the existing LTE service, and additionally indirectly indicates a resource location where a system information block (system information block type 1-bandwidth reduced, SIB1-BR) for the LTE-MTC service is transmitted. Thereby, a UE or nodes supported by the LTE-MTC service may determine whether a cell found through cell search is a cell supporting the LTE-MTC service, and if a cell found through cell search is a cell supporting the LTE-MTC service, the UE or nodes may obtain a location of a resource capable of receiving the corresponding system information block. Further, the UE supported by the existing LTE service may receive the support of an LTE service without an additional operation or a new operation to the existing operation.

A UE supporting the LTE-MTC service (hereinafter, MTC UE) performs a random access procedure based on the received various system information. Additionally, in first step, the MTC terminal determines a coverage enhancement

| PRACH configuration Index | Preamble format | $N_{SFN} = $ x | y | Subframe number | Starting symbol | Numbers of PRACH slots within a subframe | number of time-domain PRACH occasions within a PRACH slot | PRACH duration |
|---|---|---|---|---|---|---|---|---|
| 0 | 0 | 16 | 1 | 1 | 0 | — | — | 0 |
| 1 | 0 | 16 | 1 | 4 | 0 | — | — | 0 |
| 2 | 0 | 16 | 1 | 7 | 0 | — | — | 0 |
| 3 | 0 | 16 | 1 | 9 | 0 | — | — | 0 |
| 4 | 0 | 8 | 1 | 1 | 0 | — | — | 0 |
| 5 | 0 | 8 | 1 | 4 | 0 | — | — | 0 |
| 6 | 0 | 8 | 1 | 7 | 0 | — | — | 0 |
| 7 | 0 | 8 | 1 | 9 | 0 | — | — | 0 |
| 8 | 0 | 8 | 1 | 1 | 0 | — | — | 0 |
| 9 | 0 | 4 | 1 | 4 | 0 | — | — | 0 |
| 10 | 0 | 4 | 1 | 7 | 0 | — | — | 0 |
| ... | | | | | | ... | | |
| 104 | A1 | 1 | 0 | 1,4,7 | 0 | 2 | 6 | 2 |
| ... | | | | | | ... | | |
| 251 | C | 1 | 0 | 2,7 | 0 | 2 | 2 | 6 |
| 252 | C2 | 1 | 0 | 1,4,7 | 0 | 2 | 2 | 6 |
| 253 | C2 | 1 | 0 | 0,2,4,6,8 | 0 | 2 | 2 | 6 |
| 254 | C2 | 1 | 0 | 0,1,2,3,4,5,6,7,8,9 | 0 | 2 | 2 | 6 |
| 255 | C2 | 1 | 0 | 1,3,5,7,9 | 0 | 2 | 2 | 6 |

In the conventional LTE communication system, LTE-MTC (machine-type communication) technology has been developed to support application services such as Internet of Things (IoT). LTE-MTC is IoT dedicated access technology that considers key requirements such as low-power design, low-cost equipment supply, low construction cost, stable coverage, and large-scale UE access implementation. In LTE-MTC technology, a long battery life of the UE may be guaranteed based on a low-power design by introducing a power saving mode and reducing a transmission speed and transmission bandwidth compared to the LTE service. Further, because the transmission speed and transmission bandwidth are greatly reduced, complexity of a communication modem is greatly reduced, so that it is possible to implement level (CE-level) before transmitting a random access preamble (hereinafter, a physical random access channel (PRACH), a PRACH preamble and a preamble may be mixed) to the base station. As in a description of the LTE-MTC service, the MTC UE may repeatedly transmit the random access preamble several times so that terminals at a cell edge may also succeed in random access in order to increase coverage. However, because UEs at the cell center do not need to repeatedly transmit the random access preamble, multiple CE levels may be configured, and the number of repetitions of the random access preamble applied to each MTC UE, a time resource, a frequency resource, and sequence resources of the preamble may be configured differently.

Figure 8:
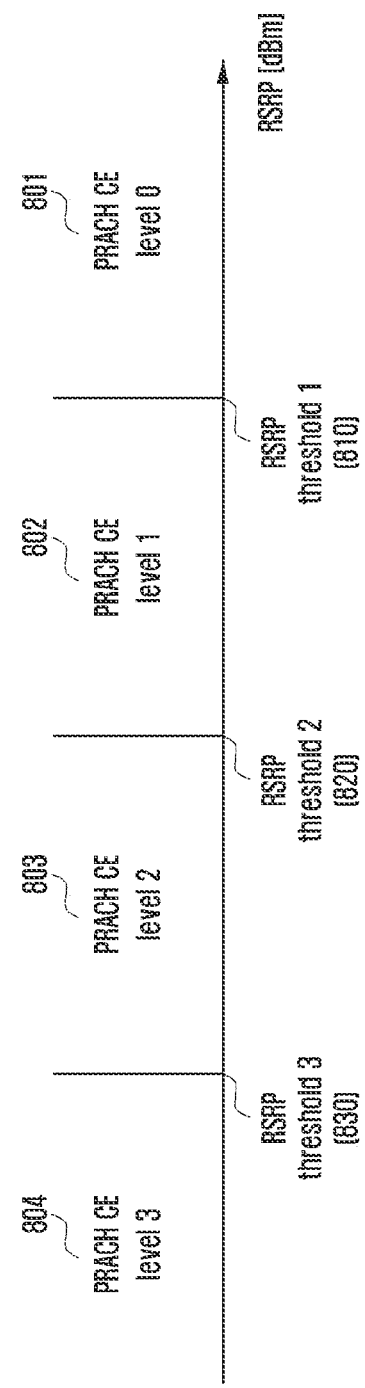
FIG. 8 is a diagram illustrating a CE level applicable to an MTC terminal.

A method for the terminal to determine a CE level will be described in detail with reference to FIG. 8. FIG. 8 is a diagram illustrating a CE level applicable to an MTC UE. The UE first measures reference signal received power (RSRP) based on a received cell-specific reference signal (CRS). A CE level is determined by comparing the CRS-RSRP value measured by the UE with a preconfigured RSRP threshold. For example, if the measured CRS-RSRP value exceeds an RSRP threshold 1, 810, the UE transmits a preamble in a PRACH resource allocated to a CE level 0, 801. If the measured CRS-RSRP value is smaller than the RSRP threshold 1, 810 and greater than an RSRP threshold 2, 820, the UE transmits a preamble in the PRACH resource allocated to a CE level 1, 802. In the same manner as described above, the terminal may determine that it corresponds to CE levels 2, 803 and 3, 804 and transmit a preamble in the PRACH resource corresponds to the determined CE level. In this case, as the CE level increases, by increasing the number of preamble repetitions, coverage for random access success may be increased.

Even in the 5G communication system, an mMTC service is being considered to support application services such as Internet of Things (IoT). In the mMTC service, in order to efficiently provide Internet of Things, it is required to support large-scale terminal access within a cell, improve UE coverage, improve a battery life, and reduce a terminal cost. In particular, in order to improve coverage of the UE, a random access procedure first transmitted by the UE should be successfully performed.

Accordingly, the disclosure provides a random access method for improving coverage of a base station and a UE in a 5G mobile communication service and an mMTC service. Further, the disclosure provides a method of repeatedly transmitting random access preambles for coverage improvement.

Hereinafter, the disclosure proposes a random access method and device for improving coverage in the mMTC service, but the gist of the disclosure is not limited to mMTC, and may be applied to services requiring access support of large-scale terminals within a cell or a service for providing IoT services, UE coverage improvement, improved battery time, and cost reduction of the UE, and may also be applied to a random access method and device for a service (e.g., URLLC) that may be provided in another 5G system.

First Embodiment

The first embodiment of the disclosure relates to a method in which a base station differentially configures transmission configurations and resources for transmitting a random access preamble and in which a UE determines and transmits a resource and a configuration for transmitting a random access preamble by itself. Through the random access transmission method described in this embodiment, as the UE changes a resource and the number of repetitions for transmitting a preamble according to channel states of the UE and the base station, the UE can efficiently perform a random access procedure.

Specifically, when considering the resource and transmission configuration for transmitting one random access preamble configured to the UE, as in the existing 5G communication system, all terminals should transmit a preamble using the same resource and transmission configuration regardless of a channel state of the UE and the base station. When the base station determines a random access preamble resource and transmission configuration for a UE located at a cell edge, the base station should configure the UE to transmit the preamble through the very high number of repetitions in a very large resource for random access success. However, in this case, in the case of a UE located at the center of the cell and having a good channel state between the UE and the base station, even though the terminal may perform successfully preamble transmission through only one preamble transmission in a very small resource, the UE may inefficiently have to perform preamble transmission up to several hundred times instead of one transmission.

In the opposite case, when the base station configures the UE to transmit the preamble with a very small resource and the small number of repetitions, UEs at a cell edge cannot succeed in the random access procedure according to the configuration.

Therefore, as in the above-described random access method of the LTE-MTC service, there is proposed a method in which the base station configures several CE levels and in which the UE determines the CE levels by itself and transmits the random access preamble. Specifically, when multiple CE levels are configured for the mMTC service, if the initial CE level is configured based on RSRP calculated through only one CRS in LTE-MTC, the disclosure proposes a method of configuring an initial CE level based on a plurality of RSRP calculated through a plurality of SSBs.

The following methods may be considered as a method for the UE to determine an initial CE level in the mMTC service.

[Method 1]

The base station may enable the terminal to determine a CE level based on one threshold. In this case, as the initial CE level is determined, when the UE attempts random access with a configuration of the corresponding CE level, but fails random access, the terminal may increase the CE level from the initial CE level to the next CE level after a specific condition is satisfied (CE-level ramping) and attempt random access with a configuration of the increased CE level to increase a random access preamble reception probability of the base station. A specific method of increasing the CE level follows the method described in the second embodiment.

The UE may compare a plurality of measured SS-RSRP (secondary synchronization RSRP) with one threshold (this may be the same as a threshold configured to determine SSBs that may select as a basis of preamble transmission when the terminal transmits a preamble in the existing 5G mobile communication system) to determine a CE level, thereby determining the initial CE level with an additional small overhead of higher signaling (or without additional overhead).

In this case, the following methods may be considered as a method in which the UE determines a CE level based on one threshold through a plurality of measured secondary synchronization RSRP (SS-RSRP).

[Method 1-1]

The UE may calculate the number of SSBs having SS-RSRP greater than the configured threshold and determine the CE level based on the number. Specifically, the UE may know a location of the SSB actually transmitted by the base station based on received SIB information, thereby measuring the SS-RSRP of each SSB based on a plurality of SSBs. After the measurement, the UE may calculate the number of SSBs having SS-RSRP greater than the configured threshold and determine the CE level based on the number.

As described above, in the 5G communication system, the base station may transmit each SSB through other transmission beams, and even in random access preamble transmission, the UE selects and transmits a preamble using a beam corresponds to one selected SSB among several SSBs and a PRACH resource (this may mean a time and/or frequency resource that may transmit a PRACH). When the UE fails to transmit a preamble in a resource corresponds to one selected SSB, in order to obtain a gain through diversity (diversity gain), the UE may select another SSB having a different beam and resource. Accordingly, the fact that the number of SSBs exceeding one threshold in which the UE may select is several means that the UE may obtain a diversity gain by changing the SSB at the corresponding CE level. Additionally, in a repeated random access preamble transmission method corresponds to a plurality of SSBs proposed in a fourth embodiment, because the number of SSBs may be related to the number of repetitions, the number of SSBs whose SS-RSRP value exceeds one threshold may be an important reference for selecting the CE level.

For example, if the number of SSBs whose SS-RSRP value exceeds one threshold is 4 or more, the UE may determine the initial CE level to a CE level 0, if the number of SSBs whose SS-RSRP value exceeds one threshold is between 3 and 2, the terminal may determine the initial CE level to a CE level 1, if the number of SSBs whose SS-RSRP value exceeds one threshold is 1, the UE may determine the initial CE level to a CE level 2, and if the number of SSBs whose SS-RSRP value exceeds one threshold is 0, the UE may determine the initial CE level to a CE level 3. In this case, the number of reference SSBs for determining the CE level may be configured to the UE through higher signaling.

[Method 1-2]

The UE may calculate a ratio of SSBs in which SS-RSRP is greater than the configured threshold and determine the CE level based on the ratio. Specifically, the UE may know a location of the SSB actually transmitted by the base station based on received SIB information, thereby measuring SS-RSRP of each SSB based on a plurality of SSBs. The UE may calculate a ratio of SSBs in which the measured SS-RSRP is greater than the configured threshold and determine the CE level based on the ratio. Specifically, SIB information received by the UE includes SSB information actually transmitted by the base station. Thereby, the UE may know the total number of SSBs in which the base station has transmitted, and calculate a ratio of SSBs in which the corresponding SS-RSRP is greater than the configured threshold. Such a method may have the same effect as that of the method 1-1, and the UE may determine an initial CE level through a ratio of the number of SSBs actually transmitted rather than the absolute number of SSBs. The fact that the number of SSBs exceeding one threshold that the terminal may select is several means that a diversity gain may be obtained by changing the SSB in the corresponding CE level. Additionally, in a repeated random access preamble transmission method corresponds to a plurality of SSBs proposed in a fourth embodiment, because the number of SSBs may be related to the number of repetitions, a ratio of SSBs whose SS-RSRP value exceeds one threshold may be an important reference for selecting the CE level.

For example, if the number of SSBs in which the SS-RSRP value exceeds one threshold is 75% or more based on the number of actually transmitted SSBs, the UE may determine the initial CE level to a CE level 0, and if the number of SSBs in which the SS-RSRP value exceeds one threshold is between 75% and 50%, the UE may determine the initial CE level to a CE level 1, if the number of SSBs in which the SS-RSRP value exceeds one threshold is between 50% and 25%, the UE may determine the initial CE level to a CE level 2, and if the number of SSBs in which the SS-RSRP value exceeds one threshold is less than 25%, the UE may determine the initial CE level to a CE level 3. In this case, a reference SSB ratio for determining the CE level may be configured to the UE through higher signaling.

[Method 2]

The base station may enable the UE to determine a CE level with several thresholds. In this case, as the initial CE level is determined, when the UE has attempted random access with a configuration of the corresponding CE level, but fails random access, after a specific condition is satisfied, the UE may increase the CE level from the initial CE level to the next CE level (CE-level ramping) and attempt random access with a configuration of the increased CE level to increase a random access preamble reception probability of the base station. A specific method of increasing the CE level follows a method described in the second embodiment. As the UE determines the CE level through a plurality of measured SS-RSRP based on several thresholds (one of several thresholds may be the same as a threshold configured for determining SSBs that may select as a basis of preamble transmission when the UE transmits a preamble in the existing 5G mobile communication system), the UE may efficiently determine the initial CE level through an accurate reference.

In this case, the following methods may be considered as a method in which the UE determines a CE level based on several thresholds through a plurality of measured secondary synchronization RSRP (SS-RSRP).

[Method 2-1]

The UE determines the CE level based on all the measured SS-RSRP. Specifically, the UE may know a location of the SSB actually transmitted by the base station based on received SIB information, thereby measuring SS-RSRP of each SSB based on a plurality of SSBs. After the measurement, the UE may determine the CE level based on all the measured SS-RSRP. In this case, the following methods may be considered as a method of determining the CE level based on all the measured SS-RSRP.

[Method 2-1-1]

The UE may compare a maximum value of all the measured SS-RSRP values with a plurality of thresholds to determine an initial CE level. By determining the initial CE level through the maximum value of all the measured SS-RSRP, when transmitting or repeatedly transmitting a preamble corresponding to one SSB, the UE may transmit a random access preamble through the smallest resource (and/or the number of repetitions) in a lowest CE level. That is, by using a small amount of PRACH resources for preamble transmission, the UE can efficiently use radio resources.

For example, if the maximum value of all the measured SS-RSRP is greater than an RSRP threshold 1, 810, the UE may determine the initial CE level to 0. If the maximum value of all the measured SS-RSRP is smaller than the RSRP threshold 1, 810 and greater than an RSRP threshold 2, 820, the UE may determine the initial CE level to a CE level 1, if the maximum value of all the measured SS-RSRP is smaller than an RSRP threshold 2, 820 and greater than an RSRP threshold 3, 830, the UE may determine the initial CE level to a CE level 2, and if the maximum value of all the measured SS-RSRP is smaller than the RSRP threshold 3, 830, the UE may determine the initial CE level to a CE level 3.

[Method 2-1-2]

The UE may compare a minimum value among all the measured SS-RSRP values with a plurality of thresholds to determine an initial CE level. By determining the initial CE level through the smallest value among all the measured SS-RSRP, when the UE transmits or repeatedly transmits a preamble corresponding to one SSB, but fails in random access (this includes, for example, a case in which the UE does not receive an RAR for a specific time after transmitting the preamble), even if the UE changes the SSB, which is a basis of preamble transmission to another SSB among all the measured SSBs (i.e., even if a beam used for transmitting the preamble is changed), the preamble may be transmitted in a CE level satisfying the reference of stable preamble transmission. In this case, even when the UE repeatedly transmits preambles corresponding to a plurality of SSBs, all the measured SSBs satisfy the reference; thus, even if the terminal selects a plurality of some SSBs for repeated transmission of the preamble, the CE level satisfying the reference may be selected.

For example, if a smallest value among all the measured SS-RSRP is greater than an RSRP threshold 1, 810, the UE may determine the initial CE level to 0. If a smallest value among all the measured SS-RSRP is smaller than the RSRP threshold 1, 810 and greater than an RSRP threshold 2, 820, the UE may determine the initial CE level to a CE level 1, if a smallest value among all the measured SS-RSRP is smaller than the RSRP threshold 2, 820 and greater than an RSRP threshold 3, 830, the UE may determine the initial CE level to a CE level 2, and if a smallest value among all the measured SS-RSRP is smaller than the RSRP threshold 3, 830, the UE may determine the initial CE level to a CE level 3.

[Method 2-1-3]

The UE may compare an average value of all the measured SS-RSRP values with a plurality of thresholds to determine an initial CE level. By determining the initial CE level through the average value of all the measured SS-RSRP, when the UE transmits or repeatedly transmits a preamble corresponding to one SSB, but fails random access, even if the UE changes the SSB, which is a basis of preamble transmission to another SSB among the n number of SSBs (i.e., even if a beam used for preamble transmission is changed), the preamble may be transmitted in the CE level satisfying on average the reference for stable preamble transmission. Here, n may be the number of all SSBs in which SS-RSRP is measured or the number of SSBs having an SS-RSRP value greater than or equal to the average value of all measured SS-RSRP. Even when the UE repeatedly transmits preambles corresponding to a plurality of SSBs, the n number of SSBs satisfy the reference on average; thus, when a plurality of appropriate SSBs are selected for repeated transmission, an efficient CE level may be selected.

For example, if the average value of the n number of SS-RSRP is greater than an RSRP threshold 1, 810, the UE may determine the initial CE level to 0. If the average value of the n number of SS-RSRP is smaller than the RSRP threshold 1, 810 and greater than an RSRP threshold 2, 820, the UE may determine the initial CE level to a CE level 1, if the average value of the n number of SS-RSRP is smaller than an the RSRP threshold 2, 820 and greater than an RSRP threshold 3, 830, the UE may determine the initial CE level to a CE level 2, and if the average value of the n number of SS-RSRP is smaller than the RSRP threshold 3, 830, the UE may determine the initial CE level to a CE level 3.

[Method 2-1-4]

The terminal may identify a CE level corresponding to SS-RSRP values of all SSBs measured based on the plurality of thresholds, and select a CE level occupying the largest proportion as an initial CE level. By determining the CE level that all the measured SS-RSRPs include the most as the initial CE level, when the UE transmits or repeatedly transmits a preamble corresponding to one SSB, but fails random access, even if the UE changes the SSB, which is a basis of preamble transmission to another SSB among all the measured SSBs (i.e., even if a beam applied to the preamble transmission is changed), the preamble may be transmitted according to the CE level having a ratio of largest SSBs. Even when the UE repeatedly transmits preambles corresponding to a plurality of SSBs, the SSB corresponding to a specific CE level occupies a largest proportion among all the measured SSBs; thus, when a plurality of appropriate SSBs are selected for repeated transmission of the preamble, an efficient CE level may be selected.

For example, among all the measured 7 SS-RSRP values, if values greater than an RSRP threshold 1, 810 are 2, if values smaller than the RSRP threshold 1, 810 and greater than an RSRP threshold 2, 820 are 3, if a value smaller than the RSRP threshold 2, 820 and greater than the RSRP threshold 3, 830 is 1, and if a value smaller than the RSRP threshold 3, 830 is 1, the terminal may determine the initial CE level to a CE level 1 including the most SS-RSRP values.

[Method 2-2]

Figure 9:
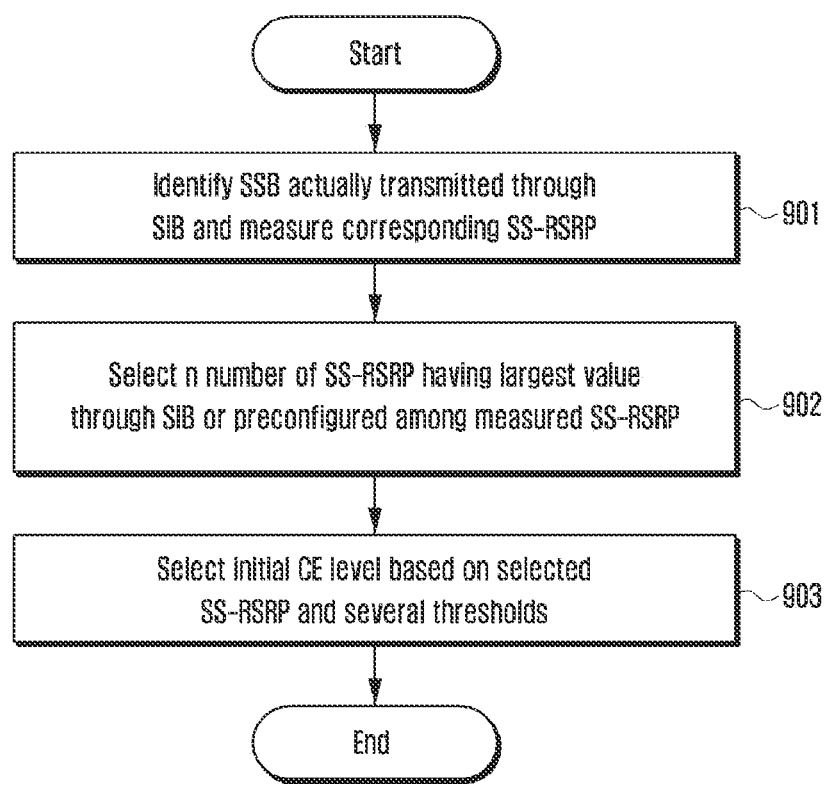
FIG. 9 is a flowchart illustrating a method of determining a CE level based on the n number of SS-RSRP having a largest value among measured SS-RSRP.

The terminal determines a CE level based on the n number of largest SS-RSRP among measured SS-RSRP. FIG. 9 is a flowchart illustrating a method of determining a CE level based on the n number of SS-RSRP having a largest value among measured SS-RSRP. Referring to FIG. 9, the UE may know a location of the SSB actually transmitted by the base station based on received SIB information, thereby measuring each SS-RSRP based on a plurality of SSBs (step 901). After the measurement, the UE may determine a CE level based on the n number of largest SS-RSRP among the measured SS-RSRP (step 902). Here, n may be a preconfigured value or a value configured through the SIB (n may be explicitly indicated through the SIB, or may be related to the number of related repeated transmissions or the number of SSBs actually transmitted for repeated transmission (see the fourth embodiment) of a preamble corresponding to a plurality of SSBs that may be indicated through the SIB). In this case, the following methods may be considered as a method of determining the CE level based on the n number of largest SS-RSRP. Through a method described below, the UE selects a CE level based on the n number of SS-RSRP (step 903). Each step described in the drawings does not necessarily have to be performed in the described order, and the order in which each step is performed may be changed or omitted.

[Method 2-2-1]

The UE may compare a minimum value among the n number of selected SS-RSRP values with a plurality of thresholds to determine an initial CE level. By determining the initial CE level through the smallest value among the n number of selected SS-RSRP, when the UE transmits or repeatedly transmits a preamble corresponding to one SSB, but fails random access, even if the UE changes the SSB, which is a basis of preamble transmission to another SSB among the n number of SSBs (i.e., even if a beam used for preamble transmission is changed), the preamble may be transmitted in the CE level satisfying the reference for stable preamble transmission. Even when the UE repeatedly transmits preambles corresponding to a plurality of SSBs, the n number of all SSBs satisfy the reference; thus, even if a plurality of SSBs are selected for repeated transmission, a CE level satisfying the reference may be selected.

For example, if a smallest value among the n number of SS-RSRP is greater than an RSRP threshold 1, 810, the UE may determine the initial CE level to 0. If a smallest value among the n number of SS-RSRP is smaller than the RSRP threshold 1, 810 and greater than an RSRP threshold 2, 820, the UE may determine the initial CE level to a CE level 1, if a smallest value among the n number of SS-RSRP is smaller than the RSRP threshold 2, 820 and greater than an RSRP threshold 3, 830, the UE may determine the initial CE level to a CE level 2, and if a smallest value among the n number of SS-RSRP is smaller than the RSRP threshold 3, 830, the UE may determine the initial CE level to a CE level 3.

[Method 2-2-2]

The UE may compare an average value of the n number of selected SS-RSRP values with a plurality of thresholds to determine an initial CE level. By determining the initial CE level through the average value of the n number of selected SS-RSRP, when the UE transmits or repeatedly transmits a preamble corresponding to one SSB, but fails random access, even if the UE changes the SSB, which is a basis for preamble transmission to another SSB among the n number of SSBs (i.e., even if a beam used for preamble transmission is changed), the preamble may be transmitted in a CE level satisfying on average the reference for stable preamble transmission. Even when the UE repeatedly transmits preambles corresponding to a plurality of SSBs, the n number of SSBs satisfy the reference on average; thus, when a plurality of appropriate SSBs are selected for repeated transmission, an efficient CE level may be selected.

For example, if the average value of the n number of SS-RSRP is greater than an RSRP threshold 1, 810, the terminal may determine the initial CE level to 0. If the average value of the n number of SS-RSRP is smaller than the RSRP threshold 1, 810 and greater than an RSRP threshold 2, 820, the terminal may determine the initial CE level to a CE level a CE level 1, if the average value of the n number of SS-RSRP is smaller than the RSRP threshold 2, 820 and greater than an RSRP threshold 3, 830, the UE may determine the initial CE level to a CE level 2, and if the average value of the n number of SS-RSRP is smaller than an RSRP threshold 3, 830, the UE may determine the initial CE level to a CE level 3.

[Method 2-2-3]

The terminal may identify a CE level corresponding to the n number of selected SS-RSRP values based on the plurality of thresholds, and select a CE level occupying a largest proportion as an initial CE level. By determining the CE level that the n number of selected SS-RSRP include the most as the initial CE level, when the UE transmits or repeatedly transmits a preamble corresponding to one SSB, but fails random access, even if the UE changes the SSB, which is a basis of preamble transmission to another SSB among the n number of SSBs (i.e., even if a beam applied to the preamble transmission is changed), the preamble may be transmitted according to the CE level having a ratio of largest SSBs. Even when the UE repeatedly transmits preambles corresponding to a plurality of SSBs, the SSB corresponding to a specific CE level has a largest ratio among the n number of SSBs; thus, when a plurality of appropriate SSBs are selected for repeated transmission, an efficient CE level may be selected.

For example, among seven SS-RSRP values, if values greater than an RSRP threshold 1, 810 is 2, if values smaller than the RSRP threshold 1, 810 and greater than an RSRP threshold 2, 820 are 3, if a value smaller than the RSRP threshold 2, 820 and greater than an RSRP threshold 3, 830 is 1, and if a value smaller than the RSRP threshold 3, 830 is 1, the UE may determine the initial CE level to a CE level 1 including the most SS-RSRP values.

[Method 3]

The base station may enable the terminal to determine a CE level with several thresholds and one threshold. In this case, as the initial CE level is determined, when the UE has attempted random access with a configuration of the corresponding CE level, but fails random access, after a specific condition is satisfied, the UE may increase the CE level from the initial CE level to the next CE level (CE-level ramping) and attempt random access with a configuration of the increased CE level to increase a random access preamble reception probability of the base station. A specific method of increasing the CE level follows a method described in the second embodiment.

Figure 10:
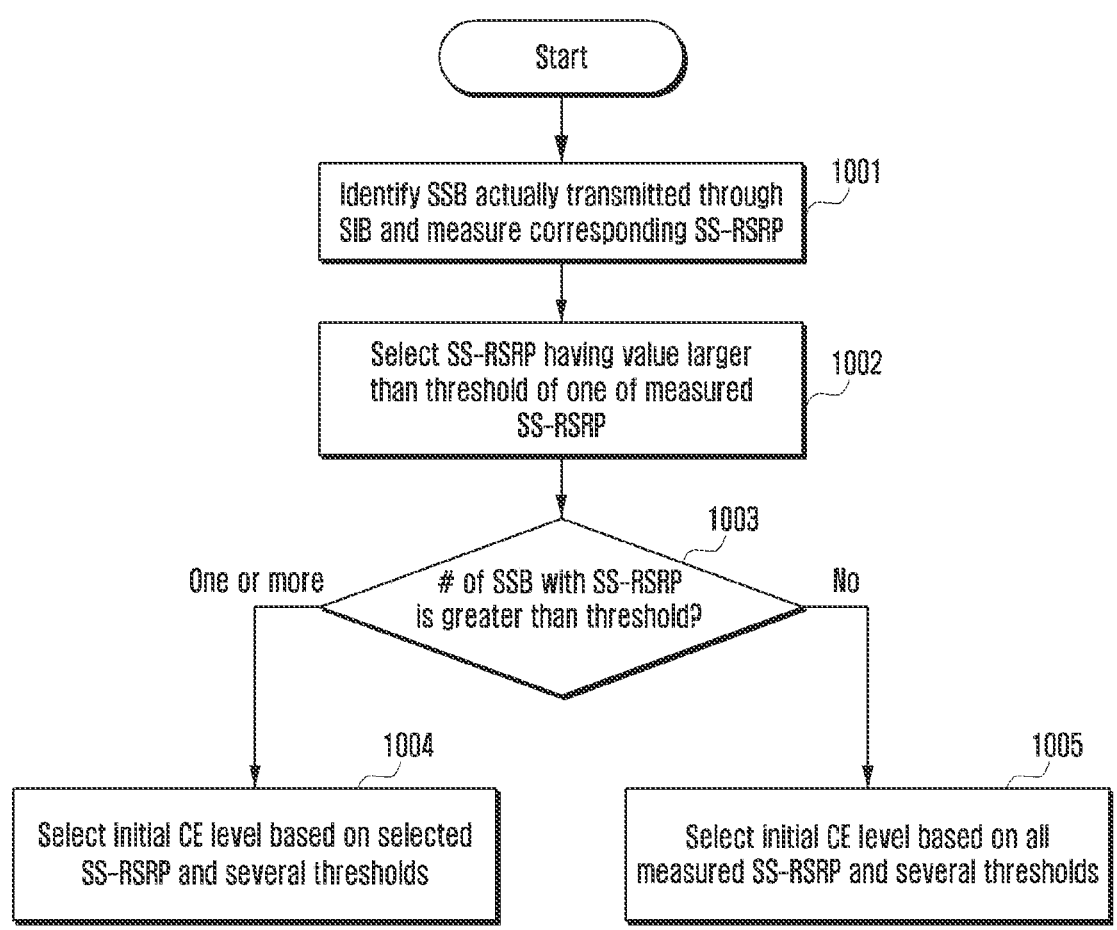
FIG. 10 is a flowchart illustrating a method for a terminal to determine an initial CE level based on several thresholds and one threshold.

FIG. 10 is a flowchart illustrating a method for a UE to determine an initial CE level based on several thresholds and one threshold. Referring to FIG. 10, the UE may know a location of the SSB actually transmitted by the base station based on received SIB information, thereby measuring SS-RSRP of each SSB based on a plurality of SSBs (step 1001). The UE first selects SS-RSRP larger than a threshold of one of a plurality of measured SS-RSRP (this may be the same as a threshold configured to determine SSBs that may be selected as the basis of preamble transmission when the UE transmits the preamble in the existing 5G mobile communication system) (step 1002). The UE identifies the number of SS-RSRP values greater than one threshold (step 1003). If there is one or more SS-RSRP exceeding the threshold, the UE may compare the selected SS-RSRP with several thresholds (this may be the same as the threshold configured for the existing 5G mobile communication system) to determine the CE level (step 1004). Each step described in the drawings does not necessarily have to be performed in the described order, and the order in which each step is performed may be changed or omitted.

If there is no SS-RSRP exceeding the threshold, the UE may compare several thresholds (this may be the same as a threshold configured for the existing 5G mobile communication system) based on all measured SS-RSRP to determine the CE level (step 1005). In this case, the UE may determine an initial CE level through the above-described method 2-1.

Through the above method, the UE may efficiently determine the initial CE level through an accurate reference. In this case, the following method may be considered as a method of determining a CE level by comparing a plurality of SS-RSRP measured by the UE in step 1004 of the above-described method of FIG. 10 with several thresholds.

[Method 3-1]

The UE may compare a maximum value among the selected SS-RSRP values with a plurality of thresholds to determine an initial CE level. By determining the initial CE level through the maximum value among the selected SS-RSRP, when the UE transmits or repeatedly transmits a preamble corresponding to one SSB, the UE may transmit a random access preamble through a smallest resource (or/and the number of repetitions) in a lowest CE level. That is, by using a small amount of PRACH resources for preamble transmission, the terminal may efficiently use radio resources.

For example, if a maximum value among the selected SS-RSRP is greater than an RSRP threshold 1, 810, the UE may determine the initial CE level to 0. If a maximum value among the selected SS-RSRP is smaller than the RSRP threshold 1, 810 and greater than an RSRP threshold 2, 820, the UE may determine the initial CE level to a CE level 1, if a maximum value among the selected SS-RSRP is smaller than the RSRP threshold 2, 820 and greater than an RSRP threshold 3, 830, the UE may determine the initial CE level to a CE level 2, and if a maximum value among the selected SS-RSRP is smaller than the RSRP threshold 3, 830, the UE may determine the initial CE level to a CE level 3.

[Method 3-2]

The UE may compare a minimum value among the selected SS-RSRP values with a plurality of thresholds to determine an initial CE level. By determining the initial CE level through the smallest value among the selected SS-RSRP, when the UE transmits or repeatedly transmits the preamble corresponding to one SSB, but fails random access, even if the UE changes the SSB, which is a basis of preamble transmission to another SSB among the selected SSBs (i.e., even if a beam used for preamble transmission is changed), the preamble may be transmitted in a CE level satisfying the reference for stable preamble transmission. In this case, even when the UE repeatedly transmits preambles corresponding to a plurality of SSBs, all the selected SSBs satisfy the reference; thus, even if a plurality of SSBs are selected for repeated transmission, a CE level satisfying the reference may be selected.

For example, if the smallest value among the selected SS-RSRP is greater than an RSRP threshold 1, 810, the UE may determine the initial CE level to 0. If the smallest value among the selected SS-RSRP is smaller than the RSRP threshold 1, 810 and greater than an RSRP threshold 2, 820, the UE may determine the initial CE level to a CE level 1, if the smallest value among the selected SS-RSRP is smaller than the RSRP threshold 2, 820 and greater than an RSRP threshold 3, 830, the UE may determine the initial CE level to a CE level 2, and if the smallest value among the selected SS-RSRP is smaller than the RSRP threshold 3, 830, the UE may determine the initial CE level to a CE level 3.

[Method 3-3]

The UE may compare an average value of the selected SS-RSRP values with a plurality of thresholds to determine an initial CE level. By determining the initial CE level through the average value of the n number of selected SS-RSRP, when the UE transmits or repeatedly transmits a preamble corresponding to one SSB, but fails random access, even if the UE changes the SSB, which is a basis of preamble transmission to another SSB among the selected SSBs (i.e., even if a beam used for preamble transmission is changed), the preamble may be transmitted in a CE level satisfying on average the reference for stable preamble transmission. Even when the UE repeatedly transmits preambles corresponding to a plurality of SSBs, the selected SSB satisfies the reference on average; thus, when a plurality of appropriate SSBs are selected for repeated transmission, an efficient CE level may be selected.

For example, if the average value of the selected SS-RSRP is greater than an RSRP threshold 1, 810, the UE may determine the initial CE level to 0. If the average value of the selected SS-RSRP is smaller than the RSRP threshold 1, 810 and greater than an RSRP threshold 2, 820, the terminal may determine the initial CE level to a CE level 1, if the average value of the selected SS-RSRP is smaller than the RSRP threshold 2, 820 and greater than an RSRP threshold 3, 830, the UE may determine the initial CE level to a CE level 2, and if the average value of the selected SS-RSRP is smaller than the RSRP threshold 3, 830, the UE may determine the initial CE level to a CE level 3.

[Method 3-4]

The UE may identify a CE level corresponding to each SS-RSRP value selected based on a plurality of thresholds, and select a CE level occupying the largest proportion as the initial CE level. By determining a CE level including the most selected SS-RSRP as the initial CE level, when the UE transmits or repeatedly transmits a preamble corresponding to one SSB, but fails random access, even if the UE changes the SSB, which is a basis of preamble transmission to another SSB among the selected SSBs (i.e., even if a beam applied to the preamble transmission is changed), the preamble may be transmitted according to the CE level having a ratio of largest SSBs. Even when the terminal repeatedly transmits preambles corresponding to a plurality of SSBs, the SSB corresponding to a specific CE level occupies the largest proportion among the selected SSBs; thus, when a plurality of appropriate SSBs are selected for repeated transmission, an efficient CE level may be selected.

For example, among 7 SS-RSRP values exceeding one RSRP threshold, if values greater than an RSRP threshold 1, 810 are 2, if values smaller than the RSRP threshold 1, 810 and greater than an RSRP threshold 2, 820 are 3, if a value smaller than the RSRP threshold 2, 820 and greater than an RSRP threshold 3, 830 is 1, and if a value smaller than the RSRP threshold 3, 830 is 1, the UE may determine the initial CE level to a CE level 1 including the most SS-RSRP values.

When the initial CE level is determined through the above methods, the UE transmits a random access preamble based on configuration information related to the corresponding CE level included in the system information block (SIB). The corresponding CE level-related information may include one or more of the following information.

PRACH configuration index (preamble format, subframe index, the number of PRACH slots included in the subframe, the number of PRACH occasions in one PRACH slot, the number of OFDM symbols of PRACH occasions, and start symbol index)

The number of repetitions of random access preamble

Repetition start slot/subframe of random access preamble

The number of maximum preamble transmission attempts

Whether frequency hopping may be applied to preamble transmission

The PDCCH repetition number for RAR (this may be understood as the number of repeated transmission of downlink control information (DCI) for scheduling the RAR)

Time/frequency resource of CORESET for RAR

Configure search area for RAR

The base station may estimate a PRACH occasion at which the UE is to transmit the random access preamble based on the CE level related information. When the random access preamble is received at a specific PRACH occasion, the base station may identify an index of the SSB, which is the basis of random access preamble transmission of the terminal based on the PRACH occasion and identify the CE level determined by the UE in consideration of the CE level related information. The base station may transmit downlink control information (DCI) for transmitting the RAR in consideration of the identified CE level on the PDCCH, and configuration information related to each CE level may be applied to the downlink control information transmission.

Figure 11:
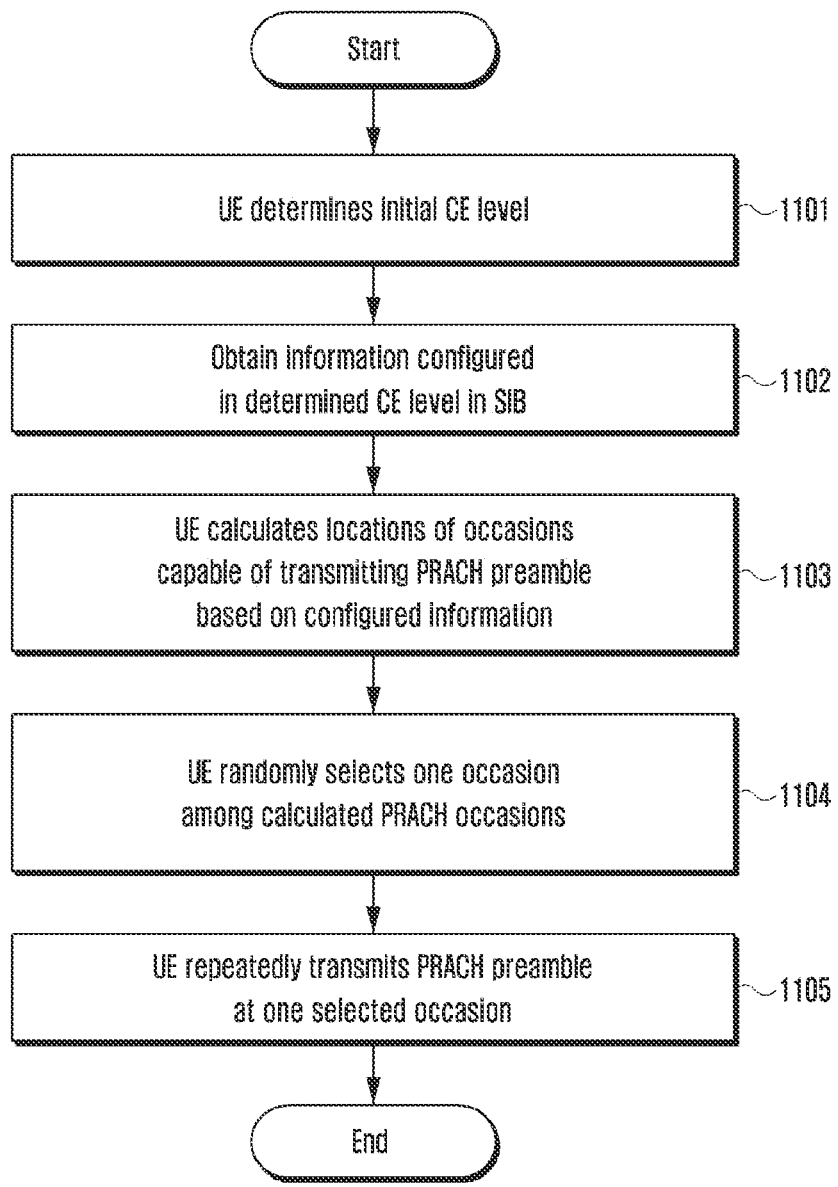
FIG. 11 is a flowchart illustrating a procedure in which a terminal transmits a PRACH preamble after an initial CE level is determined through the above method.

FIG. 11 is a flowchart illustrating a procedure of a UE transmitting a PRACH preamble after an initial CE level is determined through the above method.

Specifically, after the initial CE level is determined (step 1101), the UE obtains one or more pieces of information among the configured information according to the determined CE level (step 1102). The UE calculates locations of PRACH occasions capable of transmitting the corresponding PRACH preamble in a case where repetition of the preamble is not configured based on the configured information (e.g., a PRACH configuration index, a repetition start slot and/or subframe of a PRACH preamble, frequency hopping of the preamble) (step 1103). The UE randomly selects an occasion to transmit the preamble among the calculated PRACH preamble occasions (step 1104). Finally, the UE repeatedly transmits the PRACH preamble according to the configured repeated transmission unit (a configured unit or a preconfigured fixed unit in the information) at the selected occasion (and an occasion determined based on the selected occasion) (step 1105). Alternatively, when repeated transmission is not configured, step 1105 may be omitted. Each step described in the drawings does not necessarily have to be performed in the described order, and the order in which each step is performed may be changed or omitted.

The above methods may be applied to determine an initial CE level in a random access procedure of a supplementary uplink (SUL). Further, the above methods are not limited to a method of determining the initial CE level in a random access procedure corresponding to the mMTC service, and may be applied to determine the initial CE level in a random access procedure for a new service other than mMTC. Further, the above-described methods are not limited to a method of determining the initial CE level in a random access procedure based on the SS-RSRP value, and RSRP values measured based on a signal other than the SS-RSRP value or a measurement value other than RSRP may be used for determining the initial CE level in the random access procedure. Further, the above-described methods are not mutually exclusive, and a combination of one or more proposed methods may be used for solving the problem.

Second Embodiment

The second embodiment describes a procedure of the terminal in a case where preamble transmission fails when the UE has transmitted a random access preamble in a corresponding resource after determining the initial CE level. Specifically, after the initial CE level is determined according to the first embodiment, the UE transmits a random access preamble in the corresponding resource and waits for an RAR transmitted by the base station for a configured time after transmitting the preamble. If the RAR is not received from the base station for a predetermined time, the UE assumes that the base station has failed to receive the preamble and attempts to transmit again the preamble. In this case, in order to successfully transmit the preamble, the terminal may increase the CE level and transmit the corresponding resource and the corresponding preamble.

The following procedures may be considered as a procedure for the UE to increase the CE level.

[Method 1]

When the number of transmissions of the preamble exceeds the configured maximum number of transmissions of the preamble, the UE may increase the CE level and transmit the preamble.

Figure 12:
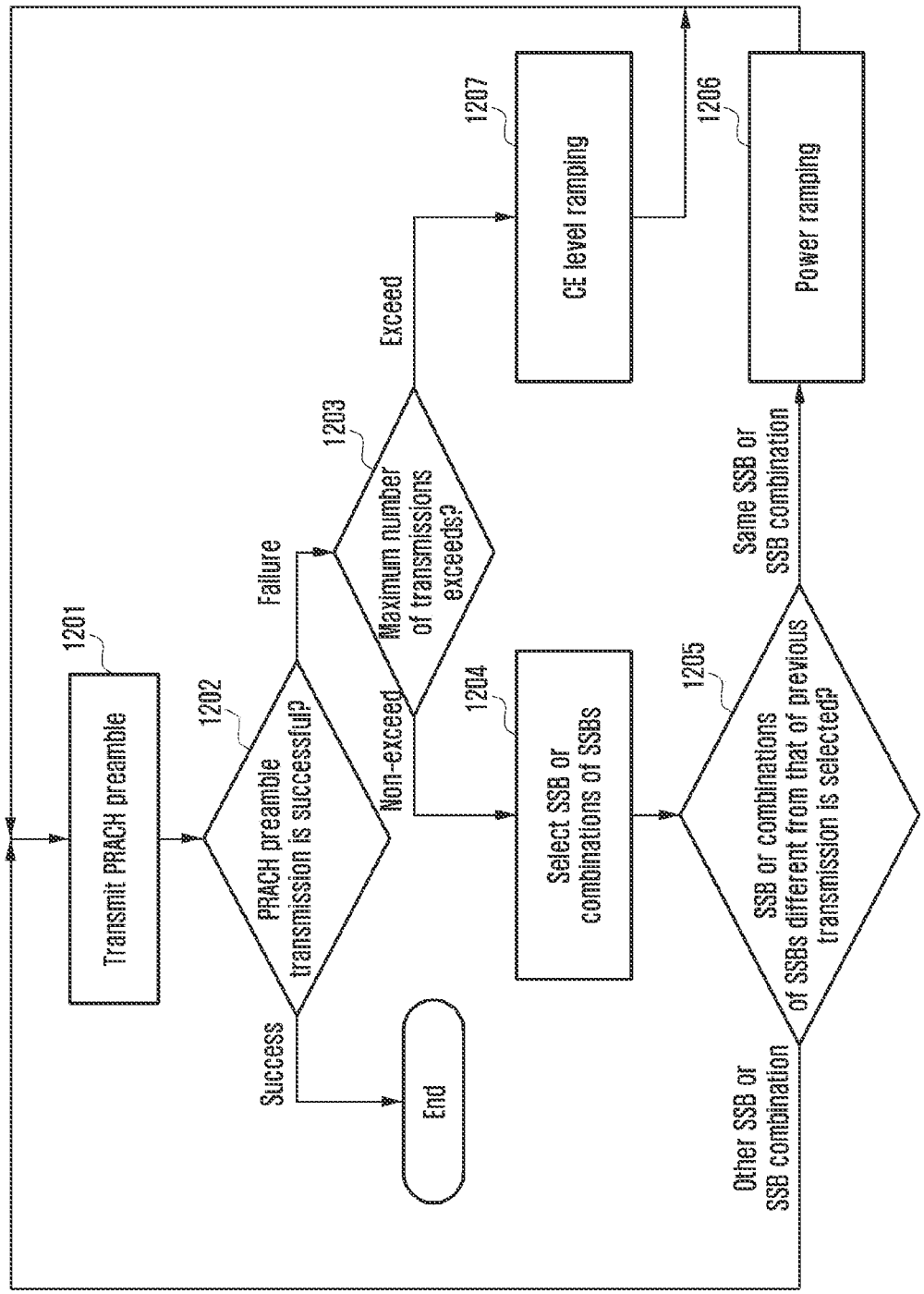
FIG. 12 is a flowchart illustrating a random access preamble transmission procedure of a terminal.

FIG. 12 is a flowchart illustrating a random access preamble transmission procedure of a terminal. Referring to FIG. 12, the UE transmits an RACH preamble (step 1201). The UE determines whether a random access preamble has been successfully transmitted based on whether an RAR transmitted by the base station is received for a configured time after transmitting the preamble (step 1202). If the UE receives the RAR for the configured time, the UE determines that the random access preamble has been successfully transmitted and prepares to transmit a message 3 (step 1208).

If the UE does not receive the RAR for the configured time, the UE assumes that the base station has not received the preamble and compares the maximum number of transmissions of the preamble configured by the SIB with the number of times in which the preamble has been actually transmitted (step 1203). If the number of times in which the UE has actually transmitted the preamble is smaller than the maximum number of transmissions, the UE selects one SSB (or one of a plurality of SSBs or combinations of SSBs configured to the UE by the base station) (step 1204). In this case, the UE determines whether the selected SSB (or one of a plurality of SSBs or combinations of SSBs configured to the terminal by the base station) is the same as the previously selected SSB (or one of a plurality of SSBs or combinations of SSBs configured to the UE by the base station) (step 1205). If the same SSB (or one of a plurality of SSBs or combinations of SSBs configured to the UE by the base station) as one SSB (or one of a plurality of SSBs or combinations of SSBs configured to the UE by the base station) selected for previous preamble transmission is selected, the UE may increase transmission power of the random access preamble by a predetermined step and transmit the random access preamble (step 1206), thereby increasing a random access preamble reception probability of the base station.

If an SSB (or one of a plurality of SSBs or combinations of SSBs configured to the UE by the base station) different from one SSB (or one of a plurality of SSBs or combinations of SSBs configured to the UE by the base station) selected for previous preamble transmission is selected, the UE transmits a corresponding preamble in a resource corresponding to the selected SSB (or one of a plurality of SSBs or combinations of SSBs configured to the UE by the base station) (step 1201). In this way, it is possible to avoid collisions to be caused when multiple UEs transmit preambles in the same resource.

If the number of times in which the UE has actually transmitted the preamble exceeds the maximum number of transmissions in step 1203, the UE may increase the CE level and transmit the corresponding preamble in the resource corresponding to the increased CE level (step 1207). Each step described in the drawings does not necessarily have to be performed in the described order, and the order in which each step is performed may be changed or omitted.

The SSB combination specified above may be configured, for example, as follows.

- SSBs in which SS-RSRP of the SSBs exceeds the RSRP threshold based on one RSRP threshold may be configured as a single combination. (The RSRP threshold may be the same as one threshold configured for configuring the initial CE level in the first embodiment, or may be one of multiple thresholds, if there are multiple thresholds)
- The n number of SSBs having the highest SS-RSRP may be configured as a single combination.
- The base station may configure preconfigured combinations of SSBs to the UE.

[Method 2]

When the number of transmissions of the preamble exceeds the configured maximum number of transmissions of the preamble, the UE selects a combination of SSBs or a plurality of other SSBs to transmit the random access preamble, and if there is no combination of SSBs or a plurality of SSBs to select, the UE may increase the CE level and transmit the preamble.

Figure 13:
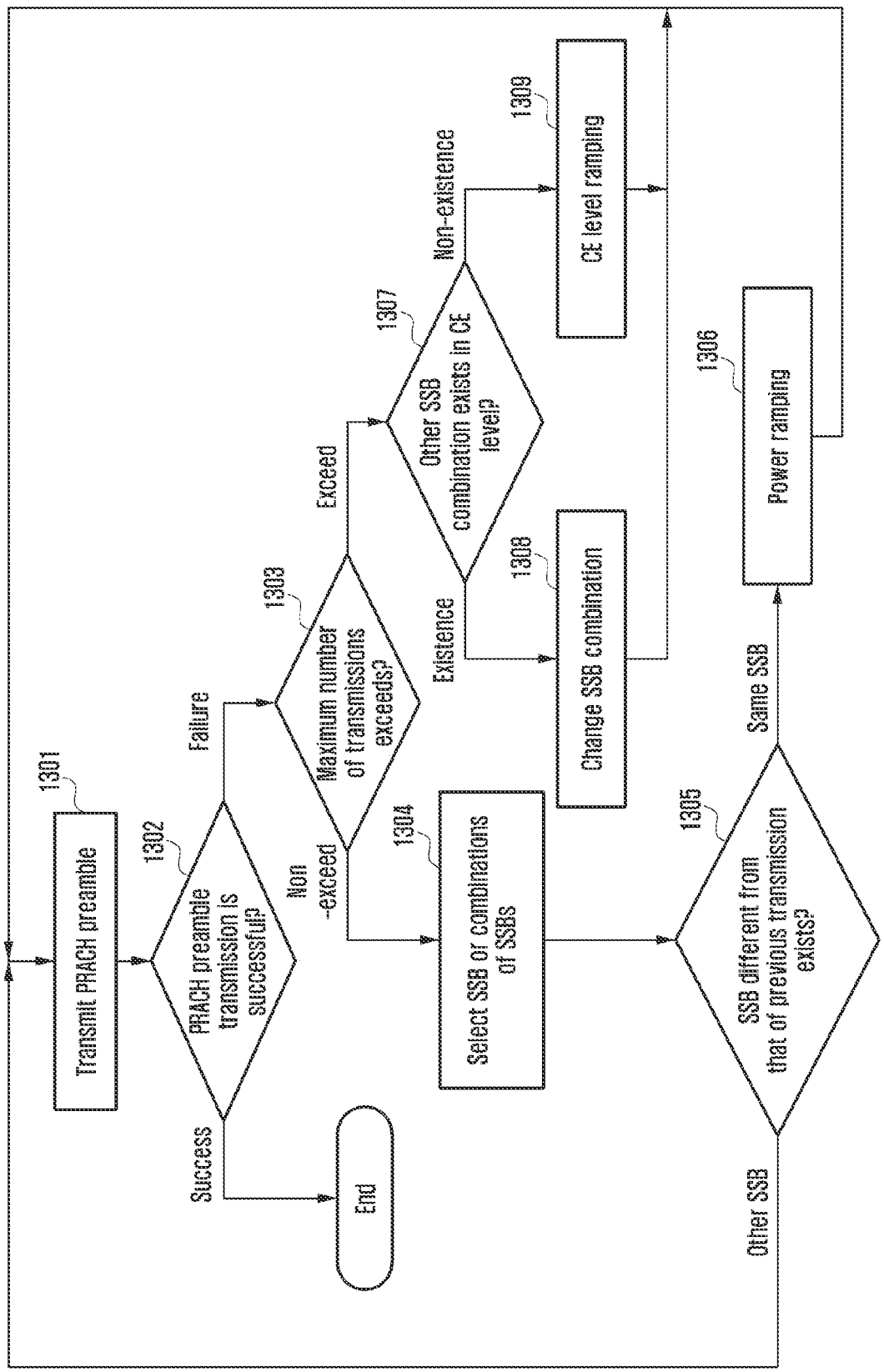
FIG. 13 is a flowchart illustrating another random access preamble transmission procedure of a terminal.

FIG. 13 is a flowchart illustrating another random access preamble transmission procedure of a UE. Referring to FIG. 13, the UE transmits a RACH preamble (step 1301). The terminal determines whether a random access preamble has successfully transmitted based on whether an RAR transmitted by the base station is received for a configured time after transmitting a preamble (step 1302). When the RAR is received for the configured time, the UE determines that the random access preamble has been successfully transmitted and prepares to transmit a message 3 (step 1310).

If the UE does not receive the RAR for the configured time, the UE assumes that the base station has not received the preamble and compares the maximum number of transmissions of the preamble configured by the SIB with the number of times in which the preamble has been actually transmitted (step 1303). If the number of times in which the UE has actually transmitted the preamble is smaller than the maximum number of transmissions, the UE selects one SSB (or a plurality of SSBs) among a plurality of selected SSBs or combinations of SSBs (step 1304). The UE determines whether the selected SSB (or one of a plurality of SSBs or combinations of SSBs configured to the UE by the base station) is the same as the previously selected SSB (or one of a plurality of SSBs or combinations of SSBs configured to the UE by the base station) (step 1305). In this case, if the same SSB (or one of a plurality of SSBs or combinations of SSBs configured to the UE by the base station) as one SSB (or one of a plurality of SSBs or combinations of SSBs configured to the UE by the base station) selected for previous preamble transmission is selected, the UE increases transmission power of the random access preamble by a predetermined step and transmits the random access preamble (step 1306), thereby increasing a random access preamble reception probability of the base station.

If an SSB (or one of a plurality of SSBs or combinations of SSBs configured to the UE by the base station) different from one SSB (or one of a plurality of SSBs or combinations of SSBs configured to the UE by the base station) selected for previous preamble transmission is selected, the UE transmits a corresponding preamble in a resource corresponding to the selected SSB (or one of a plurality of SSBs or combinations of SSBs configured to the UE by the base station) (step 1301). In this way, it is possible to avoid collisions to be caused when multiple UEs transmit in the same resource.

If the number of times in which the UE has actually transmitted the preamble exceeds the maximum number of transmissions in step 1303, the UE determines whether there is an SSB combination (or a plurality of SSBs) different from the currently selected SSB combination (or a plurality of SSBs) among SSB combinations corresponding to the currently applied CE level (step 1307). If there is another selectable SSB combination (or a plurality of SSBs), the terminal may change the SSB combination and transmit the corresponding preamble in the resource corresponding to the SSB combination (step 1308). If there is no other SSB combination (or a plurality of SSBs) that may be selected by the UE, the terminal may increase the CE level and transmit a corresponding preamble in the resource corresponding to the increased CE level (step 1309). Each step described in the drawings does not necessarily have to be performed in the described order, and the order in which each step is performed may be changed or omitted.

The above methods are not limited to a case in which preamble transmission fails when a random access preamble is transmitted in the corresponding resource after the initial CE level is determined in the mMTC service, and may be applied to a new service other than mMTC.

The above-described methods are not mutually exclusive, and a combination of one or more methods proposed above may be used for solving the problem.

Third Embodiment

The third embodiment describes a method of repeatedly transmitting a random access preamble corresponding to one SSB. Specifically, in the current 5G communication system, in order to transmit the random access preamble, the terminal first selects one SSB, and transmits the preamble at a PRACH occasion corresponding to the selected SSB.

As described above, because coverage improvement is an important factor in the mMTC service, it is possible to increase a random access success probability through repeated transmission in order to successfully transmit the random access preamble. In this case, the base station should configure an accurate location of the resource for repeated transmission of the preamble. When the terminal and the base station transmit or receive the preamble at different resource locations, it may not be possible to obtain a gain from repeated transmission or there may even be a loss. In particular, in random access preamble transmission, the base station does not configure the accurate resource location to the UE, but the terminal selects one among locations of resources capable of transmitting the preamble and transmits the preamble, and therefore, hereinafter, a method for the UE and the base station to calculate a resource location for repeated transmission of the random access preamble is proposed.

Specifically, the terminal may calculate a resource that may be a starting point among resources capable of transmitting the preamble based on the existing configuration to transmit the preamble as many times as the number of repeated transmissions from a starting resource. In particular, in the 5G mobile communication service, a resource location of the random access preamble corresponding to each SSB is determined according to the SSB selected by the UE, and hereinafter, a method of calculating a resource location for repeated transmission of the preamble based on the resource location is proposed.

In the mMTC service, the following methods may be considered as a method for a UE and a base station to calculate a resource location for repeated transmission of a random access preamble corresponding to one SSB.

[Method 1]

The UE may continuously and repeatedly transmit a random access preamble at PRACH occasions corresponding to an SSB selected by the UE. Specifically, the UE and the base station may identify an index of resources capable of transmitting the preamble based on the existing configuration. The UE may know SSB information actually transmitted by the base station based on received SIB information and calculate a location of a PRACH occasion that may transmit a preamble corresponding to each SSB according to Table 3 and the SIB configuration. When the number of PRACH occasions corresponding to all SSBs actually transmitted is N (this may be the number of PRACH occasions configured for a specific period), the UE starts an index of a first PRACH occasion from 0 and configure an index of a last PRACH occasion that may transmit a preamble within a specific period to N−1.

Here, the specific period may be explicitly configured through the SIB, may be indirectly calculated, or may follow a preconfigured time. The specific period described above may be one of, for example, a period in which a pattern between the PRACH occasion and the SSB does not change, an association period (this is multiple {1, 2, 4, 8, 16}intervals of a minimum PRACH configuration period to which a PRACH occasion corresponding to all SSBs actually transmitted is mapped at least once and for example, when a value of the association period is n, the specific period is n times larger than the PRACH configuration period), a PRACH configuration period (the x number of system frame periods in Table 3), and a period configured to the UE by the base station through the SIB.

When the terminal selects an $i_{SSB}$-th SSB among the $N_{SSB}$ number of actually transmitted SSBs, a location $n_{start}$ of a first occasion that may repeatedly transmit the preamble may be represented with Equation 2.

$$n_{start} = (j \cdot N_{start}^{PRACH} + N_{rep}^{PRACH}) \cdot N_{SSB} + i_{SSB} \text{ for } j=0, 1, 2, \ldots \text{ and } i_{SSB}=0, \ldots, N_{SSB}-1 \quad \text{[Equation 2]}$$

$N_{rep}^{PRACH}$ denotes the number of repeated transmission of the configured random access preamble, and $N_{start}^{PRACH}$ denotes a period of a resource capable of repeatedly transmitting a preamble corresponding to one SSB (i.e., $n_{start}$ has a period of an occasion that may transmit preambles corresponding to the $N_{start}^{PRACH}$ number of specific SSBs. For example, when $N_{start}^{PRACH}$ is 4 and an SSB 1 is selected ($i_{SSB}$ is 1), $n_{start}$ appears at every occasion that may transmit a preamble corresponding to an SSB 1 of No. 4). $N_{SSB}$ denotes the number of SSBs actually transmitted by the base station.

When the terminal calculates an initial occasion corresponding to the selected SSB, the terminal may repeatedly transmit the preamble at successive occasions corresponding to the selected SSB by the number of configured repeated transmissions from the initial occasion.

Figure 14:
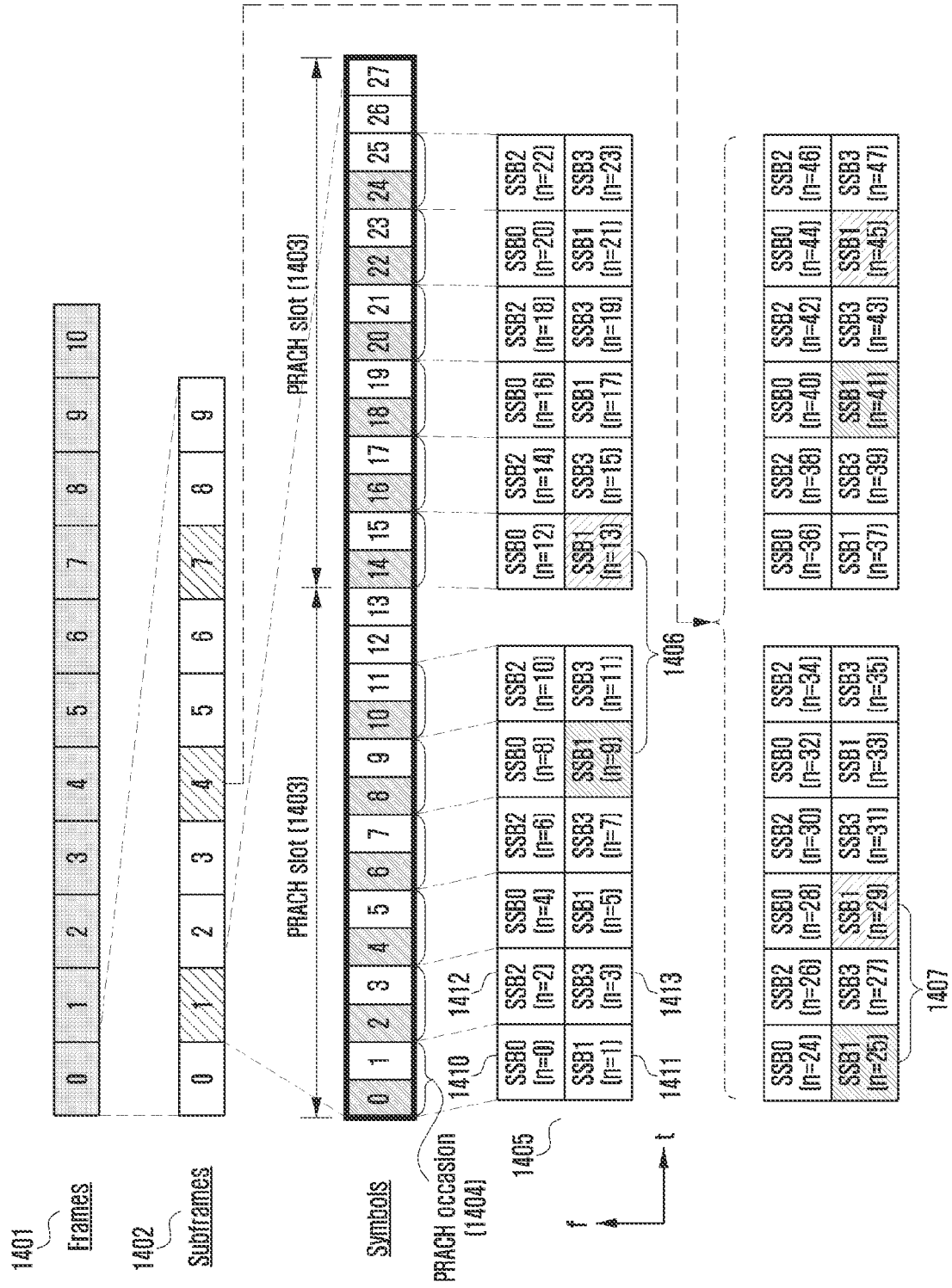
FIG. 14 is a diagram illustrating an example of a method of calculating a repeatable transmission start location of a random access preamble corresponding to one SSB.

FIG. 14 is a diagram illustrating an example of a method of calculating a repeatable transmission start location of a random access preamble corresponding to one SSB. FIG. 14 illustrates an example of a transmission resource location of a random access preamble corresponding to each SSB. When an SCS of the 5G mobile communication system is configured to 30 kHz and the PRACH configuration index of Table 3 is configured to 104, the transmission resource of the preamble exists in all frames 1401, and in subframes 1402 having indexes of 1, 4, and 7 in each frame, there is a transmission resource of a preamble. Each subframe is configured with two slots including 14 symbols, and there are total 6 PRACH occasions in each slot 1403. Each PRACH occasion 1404 is configured with two symbols. Such configurations follow Table 4.

In this case, assuming that the base station transmits 4 SSBs (in this case, NSSB is 4), transmission resource locations of the random access preamble corresponding to each SSB may be sequentially configured (1405) in order of, for example, frequency resources and time resources. For example, a PRACH occasion corresponding to an SSB index 0 is n=0 (1410), a PRACH occasion corresponding to an SSB index 1 is n=1 (1411), and the two PRACH occasions are located at symbols 0 and 1 and use different frequency resources, a PRACH occasion corresponding to an SSB index 2 is n=2 (1412), and a PRACH occasion corresponding to an SSB index 3 is n=3 (1413), and the two PRACH occasions are located at symbols 2 and 3 and use different frequency resources.

In this case, the terminal may perform repeated transmission of the random access preamble in continuous resources corresponding to each SSB. For example, when the number $N_{rep}^{PRACH}$ of repeated transmissions is configured to 2 and a period $N_{start}^{PRACH}$ is configured to 4, a first occasion that may repeatedly transmit the preamble corresponding to the SSB index 1 may be calculated as $n_{start}=9, 25, 41, \ldots$ based on Equation 2. When the UE starts repeated preamble transmission corresponding to the SSB index 1 at $n_{start}=9$, the UE may perform repeated transmission of the preamble (1406) at PRACH occasions 9 and 13. Similarly, when the UE starts repeated transmission of the preamble corresponding to the SSB index 1 at a PRACH occasion 25, the UE may perform repeated transmission (1407) of the preamble at PRACH occasions 25 and 29.

[Method 2]

The UE may repeatedly transmit the random access preamble at specific intervals at PRACH occasions corresponding to the SSB selected by the UE. Specifically, the UE and the base station may write an index of resources capable of transmitting the preamble based on the existing configuration. The UE may know SSB information actually transmitted by the base station based on received SIB information, and calculate a PRACH transmission point location that may transmit the preamble corresponding to each SSB according to Table 3 and the SIB configuration. When the number of PRACH occasions corresponding to all SSBs actually transmitted is N (this may be the number of PRACH occasions configured for a specific period), the UE may start an index of a first PRACH occasion from 0 and configure an index of a last PRACH occasion that may transmit the preamble within the specific period to N−1. Here, the specific period may be explicitly configured through the SIB, may be indirectly calculated, or may follow a preconfigured time. Specific details follow the above-described method 1.

When the UE selects an $i_{SSB}$-th SSB among the $N_{SSB}$ number of actually transmitted SSBs, a location $n_{start}$ of a first occasion that may repeatedly transmit the preamble may be represented with Equation 3.

| PRACH Configuration Index | Preamble format | $N_{SFN}$ mod $x = y$ | | Subframe number | Starting symbol | Number of PRACH slots within a subframe | $Nt^{RA,slot}$, number of time-domain PRACH occasions, within a PRACH slot | $N_{dur}^{RA}$, PRACH duration |
|---|---|---|---|---|---|---|---|---|
| | | x | y | | | | | |
| 104 | A1 | 1 | 0 | 1, 4, 7 | 0 | 2 | 6 | 2 |

$$n_{start} = (j \cdot N_{start}^{PRACH} + N_{rep}^{PRACH} + k) \cdot N_{SSB} + i_{SSB} \text{ for } j=0, 1, 2 \ldots k=0, \ldots, \lfloor N_{PRACH}^{start}/N_{rep}^{PRACH} \rfloor - 1$$
$$\text{and } i_{SSB}=0, \ldots, N_{SSB}-1 \quad \text{[Equation 3]}$$

Figure 15:
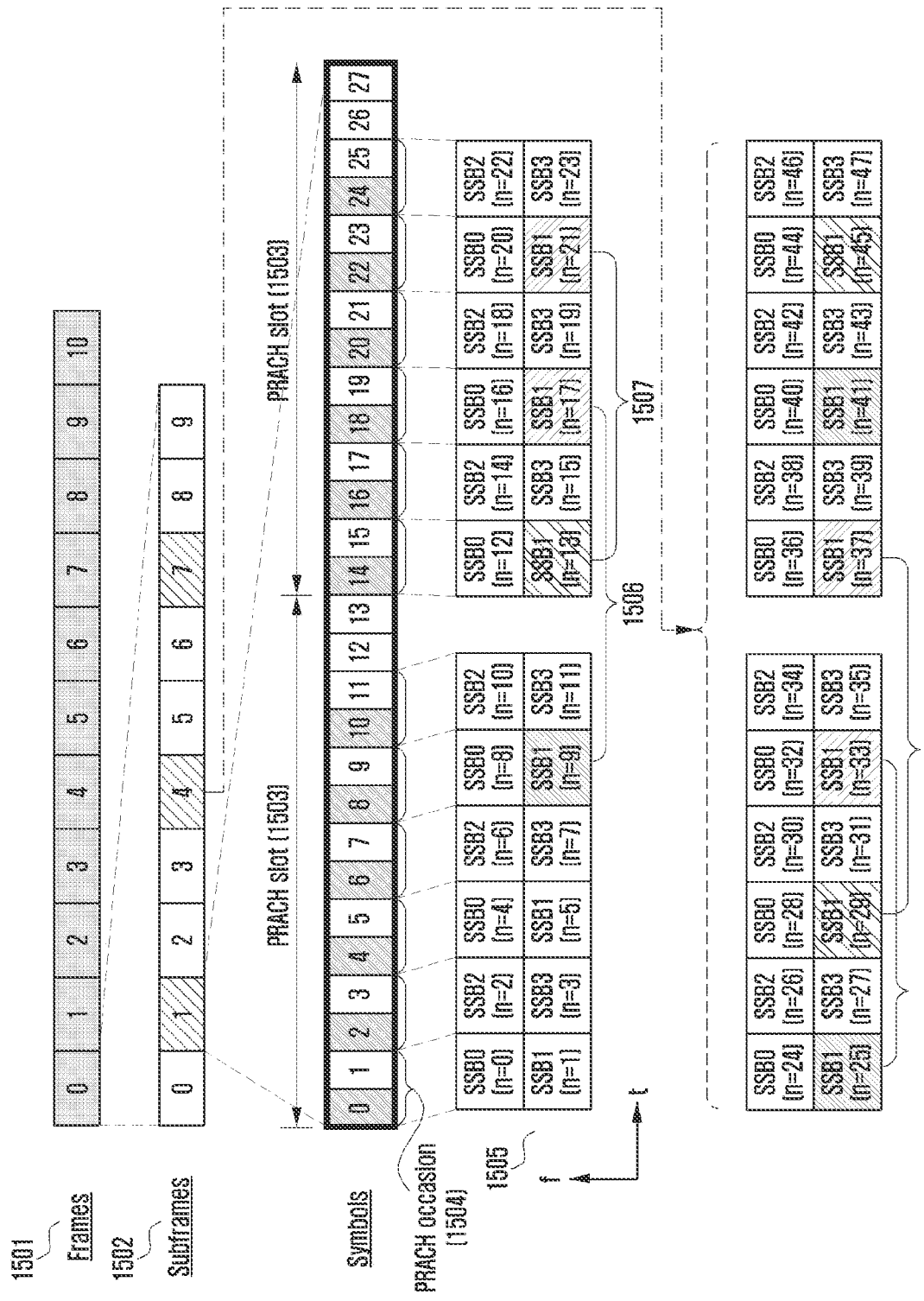
FIG. 15 is a diagram illustrating another example of a method of calculating a repeatable transmission start location of a random access preamble corresponding to one SSB.

$N_{rep}^{PRACH}$ denotes the number of repeated transmission of the configured random access preamble, and $N_{start}^{PRACH}$ denotes a period of a resource capable of repeatedly transmitting a preamble corresponding to one SSB (i.e., $n_{start}$ has a period of an occasion that may transmit preambles corresponding to the $N_{start}^{PRACH}$ number of specific SSBs. For example, when $N_{start}^{PRACH}$ is 4 and an SSB 1 is selected ($i_{SSB}$ is 1), $n_{start}$ appears at every occasion that may transmit a preamble corresponding to an SSB 1 of No. 4). $N_{SSB}$ denotes the number of SSBs actually transmitted by the base station. Referring to Equation 3, when the UE selects an SSB, an index $i_{SSB}$ is determined, and an interval between repeated transmissions may be configured as $\lfloor N_{start}^{PRACH}/N_{rep}^{PRACH}\rfloor \cdot N_{SSB}$ based on the configured $N_{rep}^{PRACH}$ and $N_{start}^{PRACH}$. The terminal may randomly select one value of values from 0 to $\lfloor N_{start}^{PRACH}/N_{rep}^{PRACH}\rfloor -1$ with a value of k to randomly select a first occasion of the preamble. The UE may calculate an initial occasion corresponding to the selected SSB according to the selected value and repeatedly transmit the preamble at an occasion corresponding to the selected SSB at intervals $\lfloor N_{start}^{PRACH}/N_{rep}^{PRACH}\rfloor \cdot N_{SSB}$ as many as the number of configured repeated transmissions from the initial occasion. Through such a method, it is possible to reduce a collision probability of preamble transmission between UEs, which may occur when a plurality of UEs simultaneously perform random access in the mMTC service. In particular, when the preamble is repeatedly transmitted, collisions are highly likely to occur during a plurality of repeated transmissions; thus, it may be important to reduce a collision probability between UEs. FIG. 15 is a diagram illustrating another example of a method of calculating a repeatable transmission start location of a random access preamble corresponding to one SSB. FIG. 15 illustrates an example of a transmission resource location of a random access preamble corresponding to each SSB. When an SCS applied to the 5G mobile communication system is 30 kHz and the PRACH configuration index of Table 3 is configured to 104, a transmission resource of the preamble exists in all frames 1501, and in subframes 1502 having indexes of 1, 4, and 7 in each frame, there is a transmission resource of the preamble. Each subframe is configured with two slots, and there are total six PRACH occasions in each slot 1503. Each PRACH occasion 1504 is configured with two symbols. Such configurations follow Table 4.

In this case, assuming that the base station transmits 4 SSBs (in this case, $N_{SSB}$ is 4), transmission resource locations of the random access preamble corresponding to each SSB may be sequentially configured (1505) in order of, for example, frequency resources and time resources. Such a configuration is the same as an example of FIG. 14. In this case, the UE may perform repeated transmission of the random access preamble in continuous resources corresponding to each SSB. For example, when the number $N_{rep}^{PRACH}$ of repeated transmissions is configured to 2 and a period $N_{start}^{PRACH}$ is configured to 4 and the UE selects k=1, a repeatable transmission start location of the preamble corresponding to the SSB index 1 may be calculated as $n_{start}$=13, 29, 45, . . . based on Equation 3. When the UE starts repeated preamble transmission at $n_{start}$=13 (according to an interval $\lfloor N_{start}^{PRACH}/N_{rep}^{PRACH}\rfloor \cdot N_{SSB}$=8 between occasions calculated above after skipping a PRACH occasion index 17), the UE may perform repeated transmission of the preamble at PRACH occasions 13 and 21 (1507).

According to the method 1 or 2, because the base station may know an index of the actually transmitted SSB, the base station may estimate a plurality of PRACH occasions that may repeatedly transmit a preamble determined according to the method 1 or 2 based on the SSB index. Thereafter, the base station may receive the preamble transmitted by the UE, and identify a preamble transmitted and received by the UE at the plurality of estimated PRACH occasions as a repeatedly transmitted preamble. The base station may identify an SSB index based on preamble transmission of the UE based on the plurality of received preambles and a PRACH occasion at which the preamble are transmitted, and transmit downlink control information scheduling the RAR, thereby performing a random access procedure.

According to the above methods, the mMTC UE may repeatedly transmit a preamble corresponding to one SSB during random access to improve coverage. Coverage improvement is one of the main goals of the mMTC service, and according to the above method, because coverage may be increased according to repeated transmission of the preamble, the mMTC service support can be efficiently performed.

The above methods are not limited to a repeated transmission method of a random access preamble corresponding to one SSB in the mMTC service, and may be applied to a new service other than mMTC.

<Example 3-1>

In the repeated random access preamble transmission method described in the third embodiment, when the number of repetitions of the random access preamble configured by the base station is configured to be greater than the number of PRACH transmission points that correspond to each SSB during a specific period to be capable of transmitting a preamble corresponding to a specific SSB, repeated transmission of the preamble may be performed in the following method.

[Method 1]

When the number of repeated transmissions of a random access preamble configured to the terminal by the base station is greater than the number of PRACH occasions that correspond to each SSB during a specific period to be capable of transmitting a preamble corresponding to a specific SSB, the specific period known in advance by the base station and the UE may be gradually increased by a multiple of two until the number of PRACH occasions that correspond to each SSB to be capable of transmitting a preamble corresponding to the specific SSB is greater than the number of repeated transmissions. In this case, the base station may directly configure a multiple applied to a specific period to the UE, but because the base station and the UE may each identify the PRACH occasion, it may not be necessary for the base station to notify the UE of the multiple that should increase the specific period.

[Method 2]

When the number of repeated random access preamble transmissions configured to the terminal by the base station is greater than the number of PRACH occasions that correspond to each SSB during a specific period to be capable of transmitting a preamble corresponding to a specific SSB, the UE may repeatedly transmit the preamble as many as the number of PRACH occasions that correspond to each SSB to be capable of transmitting a preamble. That is, the preamble may not be repeatedly transmitted as many times as the number of configured repeated transmissions. When the above-described specific period or the number of repeated preamble transmissions are not configured at the same time (e.g., when a specific period is configured through the MIB and the number of repeated preamble transmissions is configured through the SIB), the UE may receive the number of repeated transmissions of the preamble through the above method.

The above-described methods are not mutually exclusive, and a combination of one or more methods proposed above may be used for solving the problem.

Fourth Embodiment

In the fourth embodiment, a method of repeatedly transmitting random access preambles corresponding to a plurality of SSBs is described. Specifically, in order for the UE to repeatedly transmit random access preambles corresponding to a plurality of SSBs, the base station may first configure one set or more than one set including at least one SSB of SSBs actually transmitted. When the UE repeatedly transmits the preamble, if the UE and the base station do not transmit and receive in mutually agreed resources, it is impossible to obtain a gain from repeated transmission. Therefore, in the case of transmission of a random access preamble corresponding to a plurality of SSBs, because the base station does not know which number of SSBs the UE selects and transmits, by configuration a set in advance, the UE transmits the preamble corresponding to the SSB included in the specific set; thus, the UE and the base station may transmit the preamble in the mutually agreed resource.

That is, when transmitting a random access preamble corresponding to one SSB, if the terminal selects an SSB, the terminal may select a set of SSBs when simultaneously transmitting random access preambles corresponding to a plurality of SSBs. After the terminal selects a set of SSBs, the UE transmits random access preambles corresponding to the SSBs included in the set. Hereinafter, a method for the UE and the base station to calculate a location of a resource for repeated transmission of a random access preamble is proposed. Specifically, according to the disclosure, the UE may calculate a resource that may be a starting point among resources that may transmit the preamble based on the existing configuration to transmit the preamble by the number of repeated transmissions from the start resource. In particular, in the 5G mobile communication service, a resource location of the random access preamble corresponding to each SSB is determined according to the SSB selected by the terminal, and hereinafter, a method of calculating a resource location for repeated transmission of the preamble based on the resource location is proposed.

A plurality of SSBs constituting the set specified above may be configured, for example, as follows.
  SS-RSRP of SSBs may be configured with SSBs exceeding a threshold based on one RSRP threshold. (This may be the same as one threshold configured for configuring an initial CE level in the first embodiment or may be one threshold when there are a plurality of thresholds.)
  The plurality of SSBs may be configured with the n number of SSBs having highest SS-RSRP.
  The base station may configure a plurality of preconfigured SSBs to the UE.
  In the mMTC service, the following methods may be considered as a method for a UE and a base station to calculate a resource location for repeated transmission of a random access preamble corresponding to a plurality of SSBs.

[Method 1]
The terminal may continuously and repeatedly transmit a random access preamble at PRACH occasions corresponding to SSBs included in a set selected by the UE. Specifically, the UE and the base station may identify an index of resources capable of transmitting the preamble based on the existing configuration. The UE may know SSB information actually transmitted by the base station based on the received SIB information and calculate a location of a PRACH occasion that may transmit the preamble corresponding to each SSB according to Table 3 and the SIB configuration. If the number of PRACH occasions corresponding to all SSBs actually transmitted is N (this may be the number of PRACH occasions configured for a specific period), the terminal may start an index of a first PRACH occasion from 0 and configure an index of a last PRACH occasion that may transmit the preamble within the specific period to N−1. Here, the specific period may be explicitly configured through the SIB, may be indirectly calculated, or may follow a preconfigured time. An example of a specific period may follow the third embodiment.

When the terminal selects a set of l-th SSBs, a location $n_{start}$ of a first occasion that may repeatedly transmit the preamble based on an $i_{SSB}$-th SSB having a lowest index among the $N_{SSB}^{set(l)}$ number of SSBs included in the set may be represented with Equation 4.

$$n_{start}=(j \cdot N_{start}^{PRACH}+[N_{rep}^{PRACH}/N_{SSB}^{set(l)}]) \cdot N_{SSB}+ \\ i_{SSB} \text{ for } j=0, 1, 2, \ldots \text{ and } i_{SSB}=0, \ldots, N_{SSB}-1 \quad \text{[Equation 4]}$$

$N_{rep}^{PRACH}$ denotes the number of repeated transmission of the configured random access preamble, and $N_{start}^{PRACH}$ denotes a period of a resource capable of repeatedly transmitting a preamble corresponding to one SSB. $N_{SSB}$ denotes the number of SSBs actually transmitted by the base station.

The terminal may calculate an initial occasion corresponding to SSBs included in the selected set and repeatedly transmit the preamble at successive occasions corresponding to all SSBs included as many times as the number of configured repeated transmissions from the initial occasion.

Figure 16:
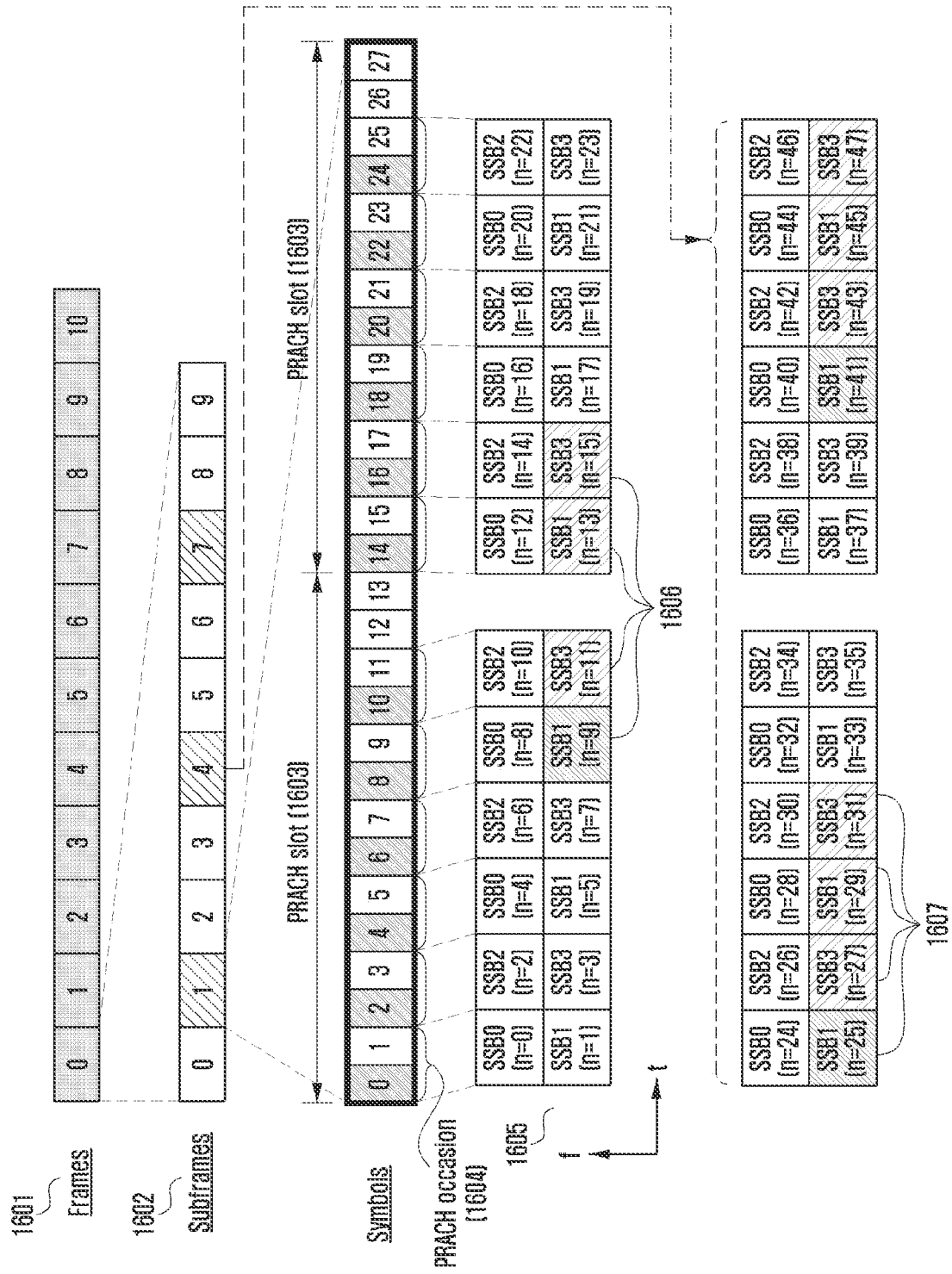
FIG. 16 is a diagram illustrating an example of a method of calculating a repeatable transmission start location of a random access preamble corresponding to a plurality of SSBs.

FIG. 16 is a diagram illustrating an example of a method of calculating a repeatable transmission start location of a random access preamble corresponding to a plurality of SSBs. FIG. 16 illustrates an example of a transmission resource location of a random access preamble corresponding to each SSB. When an SCS of the 5G mobile communication system is 30 kHz and the PRACH configuration index of Table 3 is configured to 104, a transmission resource of the preamble exists in all frames 1601, and in subframes 1602 having indexes of 1, 4, and 7 in each frame, there is a transmission resource of the preamble. Each subframe is configured with two slots, and there are total six PRACH occasions in each slot 1603. Each PRACH occasion 1604 is configured with two symbols.

In this case, assuming that the base station transmits 4 SSBs (in this case, $N_{SSB}$ is 4), transmission resource locations of the random access preamble corresponding to each SSB may be sequentially configured (1605) in order of, for example, frequency resources and time resources. Such a configuration is the same as an example of FIG. 14. In this case, the UE may perform repeated transmission of the random access preamble in continuous resources corresponding to a plurality of SSBs. For example, when the number $N_{rep}^{PRACH}$ of repeated transmissions is configured to 4 (this is the sum of 2 repetition numbers for an SSB 1 and 2 repetition numbers for an SSB 3) and a period $N_{start}^{PRACH}$ is configured to 4, if the terminal selects a set including SSB indices 1 and 3 and the number $N_{SSB}^{set(l)}$ of SSBs included in the set is 2, an initial occasion that may repeatedly transmit the corresponding preambles may be calculated as $n_{start}=9, 25, 41, \ldots$ based on Equation 4. When the UE starts repeated preamble transmission at $n_{start}=9$, the UE may repeatedly transmit (1606) preambles corresponding to SSB indexes 1 and 3 at PRACH occasion indexes 9, 11, 13, and 15. Similarly, when the UE starts repeated preamble transmission at a PRACH occasion index 25, the UE may repeatedly transmit preambles corresponding to SSB indexes 1 and 3 at PRACH occasion indexes 25, 27, 29, and 31 (1607).

[Method 2]
The UE may repeatedly transmit a random access preamble at specific intervals at PRACH occasions corresponding to SSBs included in a set selected by the terminal.

Specifically, the UE and the base station may write an index of resources capable of transmitting the preamble based on the existing configuration. The UE may know SSB information actually transmitted by the base station based on received SIB information and calculate a location of a PRACH occasion that may transmit a preamble corresponding to each SSB according to Table 3 and the SIB configuration. When the number of PRACH occasions corresponding to all SSBs actually transmitted is N (this may be the number of PRACH occasions configured for a specific period), the UE may start an index of a first PRACH occasion from 0 and configure an index of a last PRACH occasion that may transmit the preamble within the specific period to N−1. Here, the specific period may be explicitly configured through the SIB, may be indirectly calculated, or may follow a preconfigured time. Specific details follow the third embodiment.

When the UE selects a set of l-th SSBs, a location $n_{start}$ of a first occasion that may repeatedly transmit the preamble based on an $i_{SSB}$-th SSB having a lowest index among the $N_{SSB}^{set(l)}$ number of SSBs included in the set may be represented with Equation 5.

$$n_{start} = (j \cdot N_{start}^{PRACH} + \lceil N_{rep}^{PRACH}/N_{SSB}^{set(l)} \rceil + k) \cdot N_{SSB} + i_{SSB} \text{ for } j=0, 1, 2, \ldots \text{ and } k=0, \ldots, \lfloor N_{start}^{PRACH}/\lceil N_{rep}^{PRACH}/N_{SSB}^{set(l)} \rceil \rfloor -1 \text{ and } i_{SSB}=0, \ldots, N_{SSB}-1$$

[Equation 5]

$N_{rep}^{PRACH}$ denotes the number of repeated transmission of the configured random PRACH access preamble, and start denotes a period of a resource capable of repeatedly transmitting a preamble corresponding to one SSB. $N_{SSB}$ denotes the number of SSBs actually transmitted by the base station.

Referring to Equation 5, when the terminal selects an SSB set, a smallest index $i_{SSB}$ included in the set is determined, and an interval between repeated transmissions may be configured as $\lfloor N_{start}^{PRACH}/\lceil N_{rep}^{PRACH}/N_{SSB}^{set(l)} \rceil \rfloor \cdot N_{SSB}$ based on configured $N_{rep}^{PRACH}$ and $N_{start}^{PRACH}$. The UE may randomly select one value of values from 0 to $\lfloor N_{start}^{PRACH}/\lceil N_{rep}^{PRACH}/N_{SSB}^{set(l)} \rceil \rfloor -1$ start rep SSB with a value of k to randomly select a first occasion of the preamble. The UE may calculate an initial occasion corresponding to the selected SSB set and repeatedly transmit the preamble at an occasion corresponding to the SSBs included in the selected set at intervals $\lfloor N_{start}^{PRACH}/\lceil N_{rep}^{PRACH}/N_{SSB}^{set(l)} \rceil \rfloor \cdot N_{SSB}$ as many as the number of repeated transmissions configured from the initial occasion.

Through such a method, it is possible to reduce a collision probability between terminals that may occur when a plurality of UEs simultaneously perform random access in the mMTC service. In particular, when the preamble is repeatedly transmitted, collisions are highly likely to occur during a plurality of repeated transmissions; thus, it may be important to reduce a collision probability between UEs.

Figure 17:
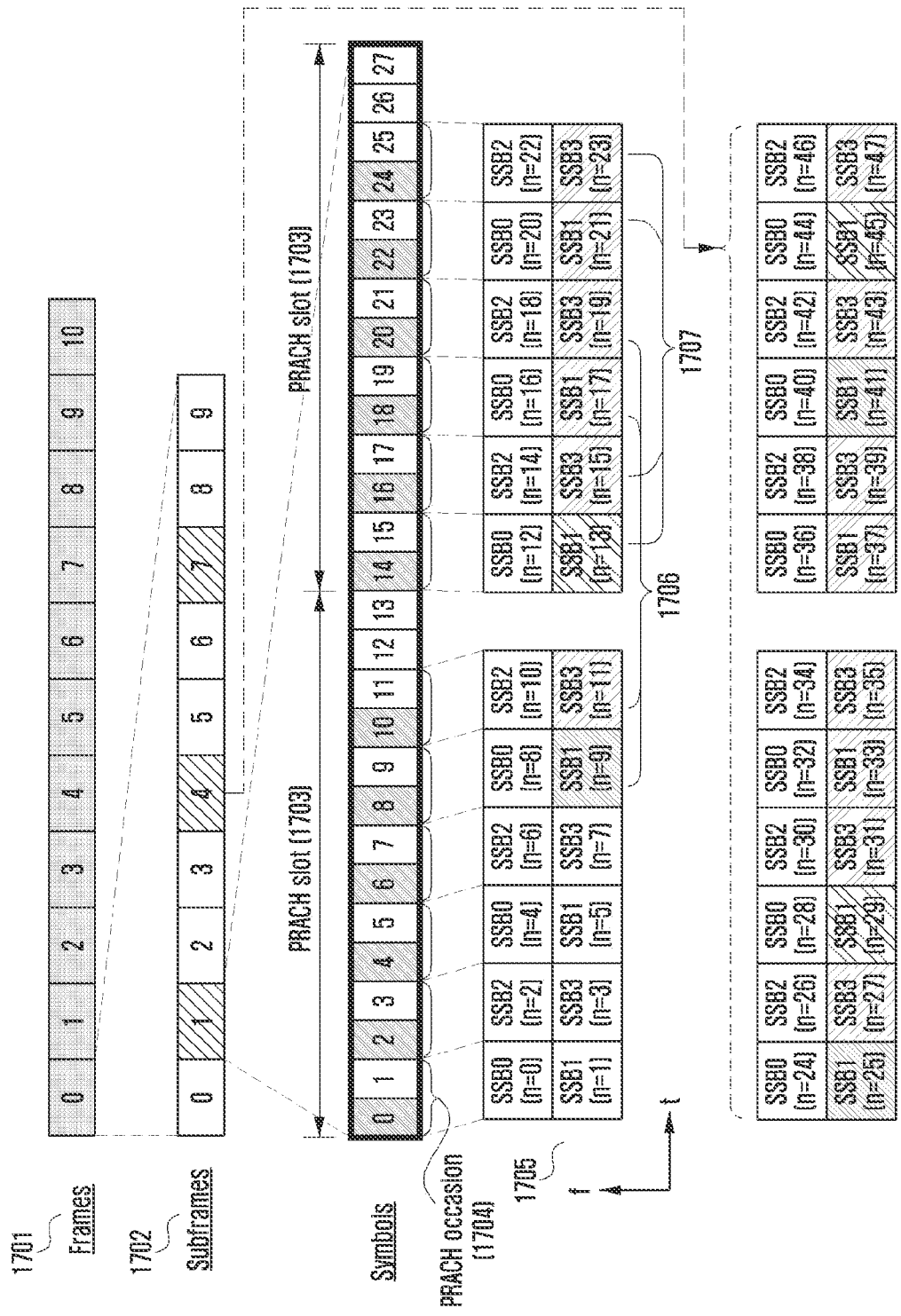
FIG. 17 is a diagram illustrating another example of a method of calculating a repeatable transmission start location of a random access preamble corresponding to a plurality of SSBs.

FIG. 17 is a diagram illustrating another example of a method of calculating a repeatable transmission start location of a random access preamble corresponding to a plurality of SSBs. FIG. 17 illustrates an example of a transmission resource location of a random access preamble corresponding to each SSB. When an SCS applied to the 5G mobile communication system is 30 kHz and a PRACH configuration index of Table 3 is configured to 104, a transmission resource of the preamble exists in all frames 1701, and in subframes 1702 having indexes of 1, 4, and 7 in each frame, there is a transmission resource of the preamble. Each subframe is configured with two slots, and there are total six PRACH occasions in each slot 1703. Each PRACH occasion 1704 is configured with two symbols. Such configurations follow Table 4.

In this case, assuming that the base station transmits 4 SSBs, transmission resource locations of a random access preamble corresponding to each SSB may be sequentially configured (1705) in order of, for example, a frequency resource and a time resource. Such a configuration is the same as the example of FIG. 14. In this case, the UE may perform repeated transmission of the random access preamble in continuous resources corresponding to each SSB. For example, when the number $N_{rep}^{PRACH}$ of repeated transmissions is configured to 4, a period $N_{start}^{PRACH}$ is configured to 4, and the UE selects k=1, if the UE selects a set including SSB indices 1 and 3, a repeatable transmission start location of the corresponding preamble may be calculated as $n_{start}$=13, 29, 45, . . . based on Equation 5. When the UE starts repeated preamble transmission at $n_{start}$=13, the terminal may perform repeated transmission (1707) of the preamble at PRACH occasions 13 and 15, and 21 and 23 (according to an interval 8 between occasions for the same SSB index calculated above after skipping occasions of indexes 17 and 19). In this case, a preamble corresponding to an SSB 1 is transmitted at PRACH occasions 13 and 21, and a preamble corresponding to an SSB 3 is transmitted at PRACH occasions 15 and 23.

In this embodiment as well as in the third embodiment, when repeated random access preamble transmission is configured, if the number of repeated random access preamble transmissions configured by the base station is greater than the number of PRACH occasions that may transmit a preamble corresponding to a specific SSB during a specific period, a description of the embodiment 3-1 may be applied.

According to the method 1 or 2, because the base station may know an index of one or more SSBs constituting a set of SSBs that the UE may select, the base station may estimate a plurality of PRACH occasions at which the preamble determined according to the method 1 or 2 may be repeatedly transmitted based on the one or more SSB indexes. Thereafter, the base station may receive the preamble transmitted by the terminal, and identify the preamble transmitted and received by the UE at the plurality of estimated PRACH occasions as the repeatedly transmitted preamble. The base station may identify an SSB index based on preamble transmission by the UE based on the plurality of received preambles and a PRACH occasion at which the preambles are transmitted and transmit downlink control information scheduling the RAR, thereby performing a random access procedure.

According to the above methods, by simultaneously and repeatedly transmitting preambles corresponding to a plurality of SSBs in random access, the mMTC UE may improve coverage. Coverage improvement is one of the main goals of the mMTC service, and according to the above method, by enabling repeated transmission of more preambles for a specific period, the coverage can be improved; thus, the mMTC service can be efficiently supported.

In the above methods, the repeated transmission method of the random access preamble corresponding to a plurality of SSBs in the mMTC service is not limited to the above-described example and may be applied to a new service other than mMTC.

The above-described methods are not mutually exclusive, and a combination of one or more methods proposed above may be used for solving the problem.

Figure 18:
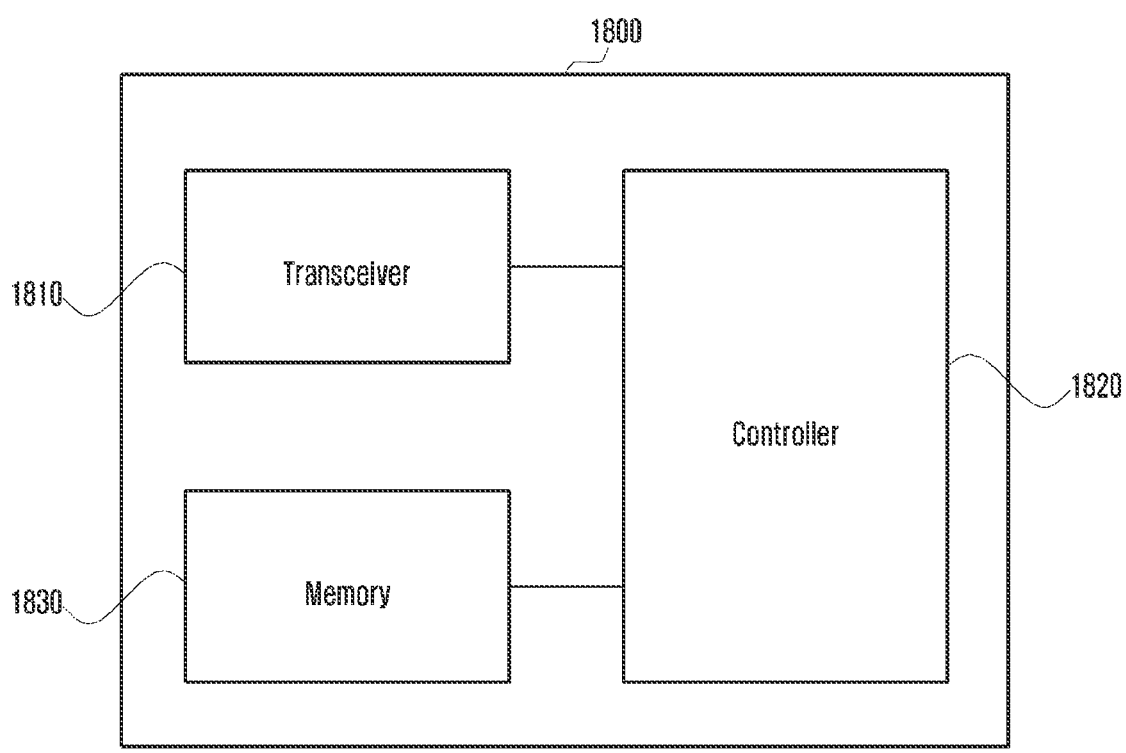
FIG. 18 is a block diagram of a terminal according to an embodiment of the disclosure.

FIG. 18 is a block diagram of a terminal according to an embodiment of the disclosure. Referring to FIG. 18, a terminal 1800 may include a transceiver 1810, a controller 1820, and a storage unit 1830. According to an efficient system information block transmission and reception method in a 5G communication system corresponding to the above-described embodiment, the transceiver 1810, the controller 1820, and the storage unit 1830 of the terminal 1800 may operate. However, components of the UE 1800 according to an embodiment are not limited to the above-described example. According to another embodiment, the UE 1800 may include more or fewer components than the aforementioned components. Further, in a specific case, the transceiver 1810, the controller 1820, and the storage unit 1830 may be implemented in the form of a single chip.

The transceiver 1810 may include a transmitter and a receiver according to another embodiment. The transceiver 1810 may transmit and receive a signal to and from the base station. The signal may include control information and data. To this end, the transceiver 1810 may include an RF transmitter for up-converting and amplifying a frequency of a transmitted signal, and an RF receiver for low-noise amplifying a received signal and down-converting a frequency thereof. Further, the transceiver 1810 may receive a signal through a wireless channel, output the signal to the controller 1820, and transmit the signal output from the controller 1820 through a wireless channel.

The controller 1820 may control a series of processes in which the UE 1800 may operate according to the above-described embodiment of the disclosure. For example, the controller 1820 may control differently a random access preamble transmission method according to an embodiment of the disclosure, that is, a resource for transmitting a random access preamble corresponding to an mMTC service and a transmission configuration method, a method of determining a random access preamble transmission resource and configuration of a UE corresponding thereto, a method of repeatedly transmitting a random access preamble corresponding to one SSB, and a method of repeatedly transmitting random access preambles corresponding to a plurality of SSBs.

The storage unit 1830 may store control information or data such as a random access preamble transmission resource configuration included in a signal obtained from the UE 1800, and have an area for storing data required for the control of the controller 1820 and data generated when controlling by the controller 1820.

Figure 19:
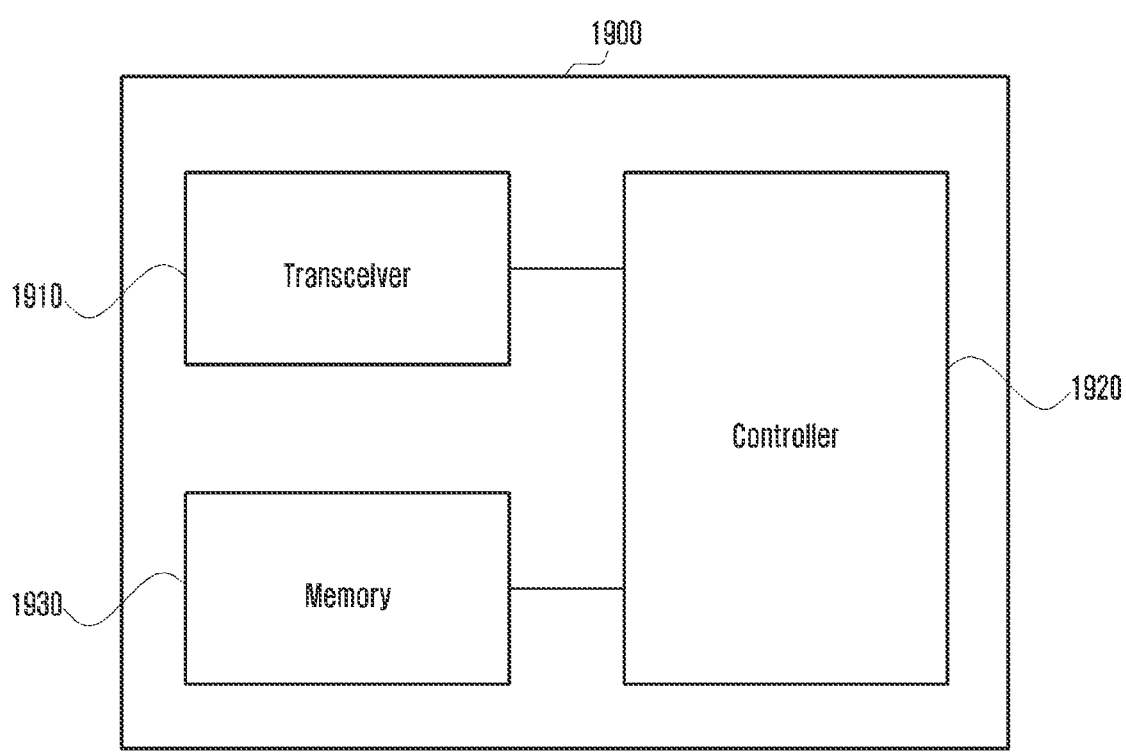
FIG. 19 is a block diagram of a base station according to an embodiment of the disclosure.

FIG. 19 is a block diagram of a base station according to an embodiment.

Referring to FIG. 19, a base station 1900 may include a transceiver 1910, a controller 1920, and a storage unit 1930. According to an efficient random access preamble transmission method in a 5G communication system corresponding to the above-described embodiment, the transceiver 1910, the controller 1920, and the storage unit 1930 of the base station 1900 may operate. However, components of the base station 1900 according to an embodiment are not limited to the above-described example. According to another embodiment, the base station 1900 may include more or fewer components than the above-described components. Further, in a specific case, the transceiver 1910, the controller 1920, and the storage unit 1930 may be implemented in the form of a single chip. The transceiver 1910 may include a transmitter and a receiver according to another embodiment. The transceiver 1910 may transmit and receive a signal to and from the terminal. The signal may include control information and data. To this end, the transceiver 1910 may include an RF transmitter for up-converting and amplifying a frequency of a transmitted signal, and an RF receiver for low-noise amplifying a received signal and down-converting a frequency thereof.

Further, the transceiver 1910 may receive a signal through a wireless channel, output the signal to the controller 1920, and transmit the signal output from the controller 1920 through a wireless channel.

The controller 1920 may control a series of processes so that the base station 1900 may operate according to the above-described embodiment of the disclosure. For example, the controller 1920 may control differently a random access preamble transmission method according to an embodiment of the disclosure, that is, a resource for transmitting a random access preamble corresponding to an mMTC service and a transmission configuration method, and a method of determining a random access preamble transmission resource and configuration of a terminal corresponding thereto, a method of repeatedly transmitting a random access preamble corresponding to one SSB, and a method of repeatedly transmitting random access preambles corresponding to a plurality of SSBs.

The storage unit 1930 may store control information and data such as a random access preamble transmission resource configuration determined by the base station 1900 and control information and data received from the UE and have an area for storing data necessary for the control of the controller 1920, and data generated when controlling by the controller 1920.

Embodiments of the disclosure disclosed in the present specification and drawings merely present specific examples in order to easily explain the technical contents of the disclosure and help the understanding of the disclosure, and are not intended to limit the scope of the disclosure. That is, it will be apparent to those of ordinary skill in the art to which the disclosure pertains that other modifications based on the technical spirit of the disclosure can be implemented. Further, each of the above embodiments may be operated in combination with each other, as needed.

The invention claimed is:

1. A method performed by a user equipment (UE) in a wireless communication system, the method comprising:
    measuring reference signal received power (RSRP) values corresponding to each synchronization signal block (SSB) based on a plurality of SSBs transmitted by a base station;
    identifying a coverage enhancement (CE) level of the UE based on the measured RSRP values and at least one RSRP threshold; and
    transmitting, to the base station, one or more random access preambles based on the identified CE level,
    wherein, in case that a plurality of RSRP thresholds is used, the CE level of the UE is identified based on the plurality of RSRP thresholds and n largest RSRP values among the measured RSRP values, and
    wherein a value of n is configured by a system information block (SIB).

2. The method of claim 1, wherein the at least one RSRP threshold is transmitted by the SIB transmitted by the base station or is determined in advance.

3. The method of claim 1, wherein, in case that a number of the at least one RSRP threshold is one, the CE level is identified based on a number of measured RSRP values exceeding the one RSRP threshold, or based on a ratio of the number of the measured RSRP values and the number of the measured RSRP values exceeding the one RSRP threshold.

4. The method of claim 1, wherein transmitting one or more random access preambles comprises:

selecting at least one SSB to be a basis of preamble transmission; and identifying one or more occasions to transmit the random access preamble based on at least one of an index of the at least one SSB or the identified CE level, wherein the one or more random access preambles are transmitted at the identified one or more occasions.

5. The method of claim 4, wherein one or more occasions to transmit the random access preamble are identified based on a first occasion of a plurality of occasions, the first occasion being identified based on a smallest SSB index among indexes of the at least one SSB, and wherein the one or more occasions to transmit the random access preamble include the first occasion and one of an occasion consecutive to the first occasion or an occasion after a specific interval from the first occasion.

6. The method of claim 1, wherein, in case that a plurality of RSRP thresholds is used, the CE level of the UE is identified by a comparison of a minimum value of the n largest RSRP values with the plurality of RSRP thresholds, or a comparison of an average value of the n largest RSRP values with the plurality of RSRP thresholds.

7. The method of claim 1, further comprising:

in case that a number of transmissions of the one or more random access preamble exceeds a threshold, identifying whether there is another plurality of SSBs different than the plurality of SSBs;

in case that there is another plurality of SSBs different than the plurality of SSBs, transmitting, to the base station, the one or more random access preambles based on the another plurality of SSBs; and in case that there is no another plurality of SSBs different than the plurality of SSBs, transmitting, to the base station, the one or more random access preambles based on a CE level that is increased from the identified CE level.

8. A user equipment (UE) in a wireless communication system, the UE comprising:

a transceiver; and a controller connected to the transceiver and configured to:

measure reference signal received power (RSRP) values corresponding to each synchronization signal block (SSB) based on a plurality of SSBs transmitted by a base station, identify a coverage enhancement (CE) level of the UE based on the measured RSRP values and at least one RSRP threshold, and transmit, to the base station, one or more random access preambles based on the identified CE level, wherein, in case that a plurality of RSRP thresholds is used, the CE level of the UE is identified based on the plurality of RSRP thresholds and n largest RSRP values among the measured RSRP values, and wherein a value of n is configured by a system information block (SIB).

9. The UE of claim 8, wherein the at least one RSRP threshold is transmitted by the SIB transmitted by the base station or is determined in advance.

10. The UE of claim 8, wherein, in case that a number of the at least one RSRP threshold is one, the CE level is identified based on a number of measured RSRP values exceeding the one RSRP threshold, or based on a ratio of the number of the measured RSRP values and the number of measured RSRP values exceeding the one RSRP threshold.

11. The UE of claim 8, wherein, in case that a plurality of RSRP thresholds is used, the CE level is identified by a comparison of a minimum value of the n largest RSRP values with the plurality of RSRP thresholds, or a comparison of an average value of the n largest RSRP values with the plurality of RSRP thresholds.

12. The UE of claim 8, wherein the controller is further configured to select at least one SSB to be a basis of preamble transmission, and identify one or more occasions to transmit the random access preamble based on at least one of an index of the at least one SSB or the identified CE level, and wherein the one or more random access preambles are transmitted at the identified one or more occasions.

13. The UE of claim 12, wherein one or more occasions to transmit the random access preamble are identified based on a first occasion of a plurality of occasions, the first occasion being identified based on a smallest SSB index among indexes of the at least one SSB.

14. The UE of claim 13, wherein the one or more occasions to transmit the random access preamble include the first occasion and one of an occasion consecutive to the first occasion or an occasion after a specific interval from the first occasion.

15. A method performed by a base station in a wireless communication system, the method comprising:

transmitting, to a user equipment (UE), a plurality of synchronization signal blocks (SSBs);

receiving, from the UE, a random access preamble;

identifying a coverage enhancement (CE) level of the UE and an index of an SSB selected as a basis for random access preamble transmission based on the received random access preamble and a resource in which the random access preamble is received; and performing a random access procedure based on the identified index of the SSB and the CE level of the UE, wherein the CE level of the UE is based on a plurality of reference signal received power, (RSRP) thresholds and n largest RSRP values among a plurality of RSRP values corresponding to each SSB of the plurality of SSBs, and wherein a value of n is configured by a system information block (SIB).

16. A base station in a wireless communication system, the base station comprising:

a transceiver; and a controller connected to the transceiver and configured to:

transmit, to a user equipment (UE), a plurality of synchronization signal blocks (SSBs), receive, from the UE, a random access preamble, identify an index of an SSB selected as a basis for random access preamble transmission and a coverage enhancement (CE) level of the UE based on the received random access preamble and a resource in which the random access preamble is received, and perform a random access procedure based on the identified index of the SSB and the CE level of the UE, wherein the CE level of the UE is based on a plurality of reference signal received power (RSRP) thresholds and n largest RSRP values among a plurality of RSRP values corresponding to each SSB of the plurality of SSBs, and wherein a value of n is configured by a system information block (SIB).

* * * * *